(12) United States Patent
Kim et al.

(10) Patent No.: US 8,149,365 B2
(45) Date of Patent: Apr. 3, 2012

(54) UPPER SUBSTRATE AND LIQUID CRYSTAL DISPLAY DEVICE HAVING THE SAME

(75) Inventors: Bong-Ju Kim, Suwon-si (KR); Joo-Sun Yoon, Seoul (KR); Yong-Ho Yang, Seoul (KR); Seung-Gyu Tae, Suwon-si (KR); Jin-Suk Park, Seoul (KR); Hyun-Young Kim, Seoul (KR); Ji-Hye Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/612,974

(22) Filed: Nov. 5, 2009

(65) Prior Publication Data

US 2010/0045916 A1    Feb. 25, 2010

Related U.S. Application Data

(62) Division of application No. 10/732,380, filed on Dec. 10, 2003.

(30) Foreign Application Priority Data

| Jan. 8, 2003 | (KR) | 2003-0001105 |
| Jan. 8, 2003 | (KR) | 2003-0001106 |
| Jan. 30, 2003 | (KR) | 2003-0006118 |
| Oct. 20, 2003 | (KR) | 2003-0072908 |

(51) Int. Cl.
   *G02F 1/1333* (2006.01)
(52) U.S. Cl. ........ 349/138; 349/149; 349/150; 349/151; 349/152; 349/153; 349/190
(58) Field of Classification Search ........... None
    See application file for complete search history.

(56) References Cited

U.S. PATENT DOCUMENTS

| 4,682,858 A | 7/1987 | Kanbe et al. |
| 4,826,297 A | 5/1989 | Kubo et al. |
| 5,510,918 A | 4/1996 | Matsunaga et al. |
| 5,870,163 A | 2/1999 | Watanabe et al. |
| 6,246,460 B1 | 6/2001 | Young |
| 6,266,116 B1 | 7/2001 | Ohta et al. |
| 6,330,046 B1 | 12/2001 | Ishitaka et al. |
| 6,373,547 B2 | 4/2002 | Saito et al. |
| 6,396,470 B1 | 5/2002 | Zhang et al. |
| 6,466,294 B1 | 10/2002 | Yamagishi et al. |
| 6,480,255 B2 | 11/2002 | Hoshino et al. |
| 6,894,755 B2 | 5/2005 | Yu |
| 7,023,518 B1 | 4/2006 | Koyama et al. |

(Continued)

FOREIGN PATENT DOCUMENTS

CN    1373389 A    10/2002

(Continued)

*Primary Examiner* — Thanh-Nhan Nguyen
(74) *Attorney, Agent, or Firm* — Cantor Colburn LLP

(57) ABSTRACT

A liquid crystal display apparatus includes a lower substrate, an upper substrate and a liquid crystal layer interposed between the lower substrate and the upper substrate. The lower substrate includes a display part for displaying image and a driving part for providing the display part with a driving signal. The upper substrate includes a common electrode and an insulating member that electrically insulates the common electrode from the driving part. The insulating member has a lower dielectric constant than the liquid crystal layer. Thus, a parasitic capacitance between the driving part and the common electrode is reduced to prevent malfunction of the driving part, and a display quality is enhanced.

9 Claims, 22 Drawing Sheets

U.S. PATENT DOCUMENTS

| | | |
|---|---|---|
| 7,143,504 B2 | 12/2006 | Tanaka |
| 7,375,790 B2 | 5/2008 | Yun et al. |
| 7,777,854 B2 * | 8/2010 | Moon ............................ 349/149 |
| 2001/0000755 A1 | 5/2001 | Hirakata et al. |
| 2001/0048502 A1 | 12/2001 | Moon et al. |
| 2001/0050747 A1 | 12/2001 | Hoshino et al. |
| 2002/0057394 A1 | 5/2002 | Takahashi et al. |
| 2002/0117691 A1 | 8/2002 | Choi et al. |
| 2002/0122143 A1 | 9/2002 | Woo et al. |
| 2002/0126234 A1 | 9/2002 | Zhang et al. |
| 2002/0167009 A1 | 11/2002 | Kim |
| 2002/0167634 A1 | 11/2002 | Watanabe et al. |
| 2003/0043331 A1 | 3/2003 | Oowaki et al. |
| 2003/0117536 A1 * | 6/2003 | Jeon ................................ 349/40 |
| 2003/0193627 A1 | 10/2003 | Hirakata et al. |
| 2004/0001172 A1 * | 1/2004 | Tanaka et al. ................. 349/113 |
| 2004/0036832 A1 | 2/2004 | Momose |
| 2004/0141140 A1 * | 7/2004 | Zhang et al. ................... 349/152 |
| 2004/0150771 A1 * | 8/2004 | Lee ................. 349/114 |
| 2004/0212772 A1 | 10/2004 | Hanakawa et al. |
| 2006/0077336 A1 * | 4/2006 | Hirakata et al. .............. 349/187 |
| 2007/0002255 A1 * | 1/2007 | Yamaguchi et al. .......... 349/149 |
| 2007/0109485 A1 | 5/2007 | Eguchi et al. |

FOREIGN PATENT DOCUMENTS

| | | |
|---|---|---|
| EP | 1081633 A2 | 3/2001 |
| JP | 06-258662 A | 9/1994 |
| JP | 10-010544 A | 1/1998 |
| JP | 10-228022 A | 8/1998 |
| JP | 10-303129 A | 11/1998 |
| JP | 2000-310784 A | 11/2000 |
| JP | 2001-077373 A | 3/2001 |
| KR | 100297865 B1 | 5/2001 |
| KR | 1020020050909 A | 6/2002 |

* cited by examiner

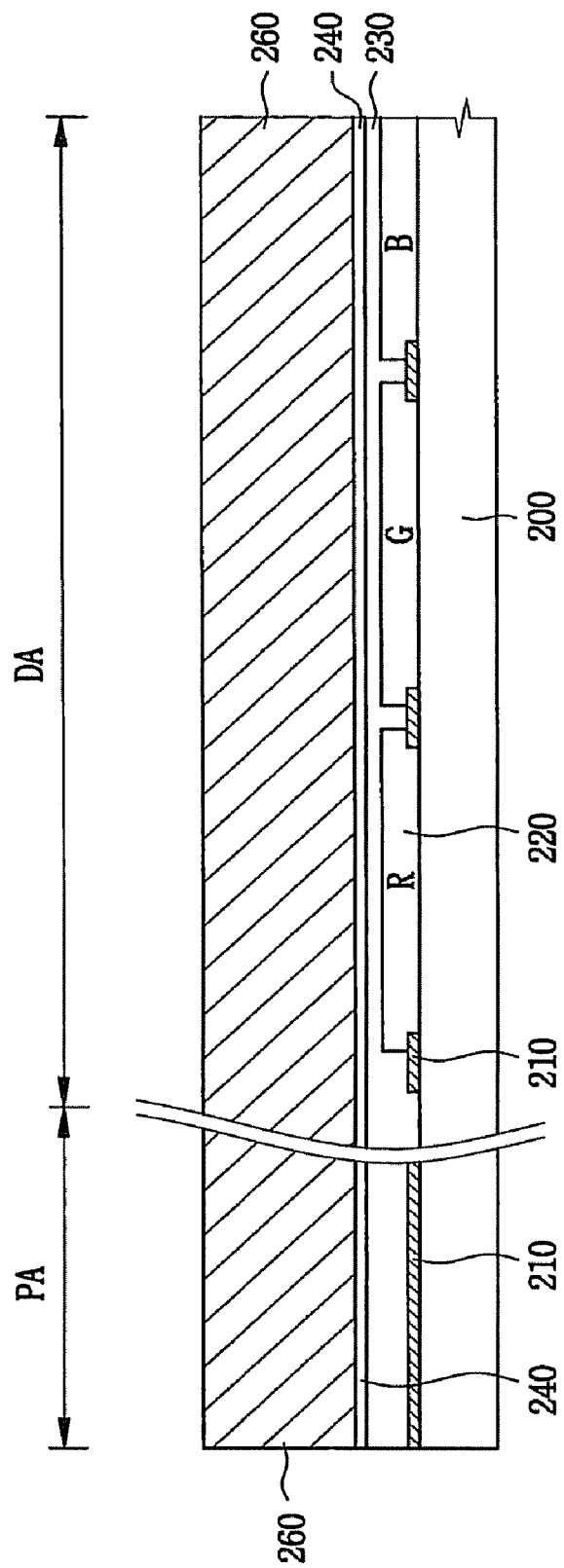

US 8,149,365 B2

UPPER SUBSTRATE AND LIQUID CRYSTAL DISPLAY DEVICE HAVING THE SAME

CROSS-REFERENCE TO RELATED APPLICATIONS

This application is a divisional application of U.S. application Ser. No. 10/732,380 filed Dec. 10, 2003, which claims priority to and the benefit of Korean Patent Application No. 2003-1105 filed on Jan. 8, 2003, Korean Patent Application No. 2003-1106 filed on Jan. 8, 2003, Korean Patent Application No. 2003-6118 filed on Jan. 30, 2003 and Korean Patent Application No. 2003-72908 filed on Oct. 20, 2003, the contents of which are herein incorporated by reference in its entirety.

BACKGROUND OF THE INVENTION

1. Field of the invention

The present invention relates to an upper substrate and a liquid crystal display apparatus (LCD) having the upper substrate, and more particularly to an upper substrate for enhancing display quality and a liquid crystal display apparatus having the upper substrate.

2. Description of related Art

FIG. 1 is a cross-sectional view of a conventional liquid crystal display apparatus and FIG. 2 is an output signal pattern of gate-driving circuit shown in FIG. 1. In FIG. 2, x-axis represents time and y-axis resents voltage.

Referring to FIG. 1, a conventional liquid crystal display apparatus 40 includes a lower substrate 10 or an array substrate 10, an upper substrate 20 or a color filter substrate 20 and a liquid crystal layer 30 interposed between the array substrate 10 and the color filter substrate 20. Electric field is formed between the color filter substrate 20 and the array substrate 10, and aligning angles of the liquid crystal molecules of the liquid crystal layer 30 are changed by the electric field, so that the liquid crystal display apparatus 40 displays an image of external signal. The array substrate 10 includes a display region DA and a peripheral region PA adjacent to the display region DA. A display part for displaying an image is disposed at the display region DA, and a driving part for driving the display part is disposed at the peripheral region PA.

The display region DA includes a plurality of pixels arranged in a matrix shape. Each of the pixels includes a gate line, a data line, a thin film transistor (TFT) 11 that is electrically connected to the gate line and the data line, and a pixel electrode 12 electrically connected to the thin film transistor 11.

A gate driving circuit 16 that applies drive voltage to the gate line is formed in the peripheral region PA through a process of forming thin film transistor. Forming the gate driving circuit 16 in the peripheral region PA reduces a number of processes of manufacturing the liquid crystal display apparatus 40, and volume and a size of the liquid crystal display apparatus 40.

A common electrode 24 of the color filter substrate 20 is formed to face the pixel electrode 12 of the display region DA and the liquid crystal layer 30 is interposed between the common electrode 24 and the pixel electrode 12. A cell gap retaining member 25 is formed on the common electrode 24 for retaining the cell gap of the liquid crystal display apparatus 40.

Since the common electrode 24 also faces the gate driving circuit 16 of the peripheral region PA and the liquid crystal layer 30 is interposed between them, there exists a parasitic capacitance between the gate driving circuit 16 and the common electrode 24.

In FIG. 2, a solid line A1 is a normal curve, whereas the dotted line A2 is a distorted curve caused by the parasitic capacitance between the gate driving circuit 16 and the common electrode 24. FIG. 2 shows that maximum point of voltage of the distorted curve is at least 5V lower than that of the normal curve.

According to FIG. 2, the parasitic capacitance causes a distortion and a delay of output signal of gate driving circuit 16, and eventually deterioration of the display quality of liquid crystal display apparatus 40.

Further, when external forces applied to the peripheral region PA, the common electrode 24 and the gate driving circuit 16 may be electrically shorted to cause malfunction of the gate driving circuit 16.

SUMMARY OF THE INVENTION

Accordingly, the present invention is provided to substantially obviate one or more problems due to limitations and disadvantages of the related art.

It is a feature of the present invention to provide an upper substrate.

It is another feature of the present invention to provide a liquid crystal display apparatus.

In one aspect of the upper substrate, the upper substrate that is to be combined with a lower substrate including a display part for displaying an image and a driving part disposed adjacent to the display part for applying driving signals to the display part, while a liquid crystal layer is interposed between the upper substrate and the lower substrate, the upper substrate, includes a common electrode and an insulating member. The insulating member electrically insulates the common electrode from the driving part.

In another aspect of the liquid crystal display apparatus, the liquid crystal display apparatus includes a lower substrate, an upper substrate and a liquid crystal layer. The lower substrate includes a display part for displaying image and a driving part for providing the display part with a driving signal. The upper substrate includes a common electrode and an insulating member that electrically insulates the common electrode from the driving part. The liquid crystal layer is interposed between the lower substrate and the upper substrate.

In still another aspect of the liquid crystal display apparatus, the liquid crystal apparatus includes a lower substrate, an upper substrate, a combining member and a liquid crystal layer. The lower substrate includes a display part for displaying an image and a driving part disposed adjacent to the display part. The driving part provides the display part with a driving signal. The upper substrate includes a common electrode. The combining member is disposed between the display part and the driving part. The combining member combines the lower substrate and the upper substrate. The liquid crystal layer is interposed between the lower substrate and the upper substrate.

In still another aspect of the liquid crystal display apparatus, the liquid crystal apparatus includes a lower substrate, an upper substrate and a liquid crystal layer. The lower substrate includes a display part for displaying an image and a driving part for driving the display part. The driving part includes a conducting layer that electrically connects a first conductive pattern to a second conductive pattern that is disposed at different layer with the first conductive pattern. The upper substrate includes a common electrode and insulating member that insulates the common electrode from the conducting layer. The liquid crystal layer is interposed between the lower substrate and the upper substrate.

According to the present invention, an insulating layer or air having a lower dielectric constant than a liquid crystal layer is interposed between a driving part of a lower substrate and a common electrode of the upper substrate. Thus, a parasitic capacitance between the driving part and the common electrode is reduced to prevent malfunction of the driving part, and a display quality is enhanced. Further, an electrical short between the driving part and the common electrode is prevented, so that display quality of the liquid crystal display apparatus is enhanced.

Then, a parasitic capacitance between the driving part and the common electrode is reduced to prevent a mal-function of gate driving circuit of the driving part. Therefore, the display quality of the liquid crystal display apparatus is enhanced.

Further, the protection layer protects the gate driving circuit to prevent an electrical short of the gate driving circuit and the common electrode, so that the display quality of the liquid crystal display apparatus is enhanced also.

BRIEF DESCRIPTION OF THE DRAWINGS

The above and other advantages of the present invention will become readily apparent with reference to the following detailed description and the accompanying drawings wherein:

FIGS. 6A, 6B, 6C and 6D are cross-sectional views illustrating a process of manufacturing the color filter substrate shown in FIG. 3;

DETAILED DESCRIPTION OF THE PREFERRED EMBODIMENTS

Embodiment 1

Figure 3:
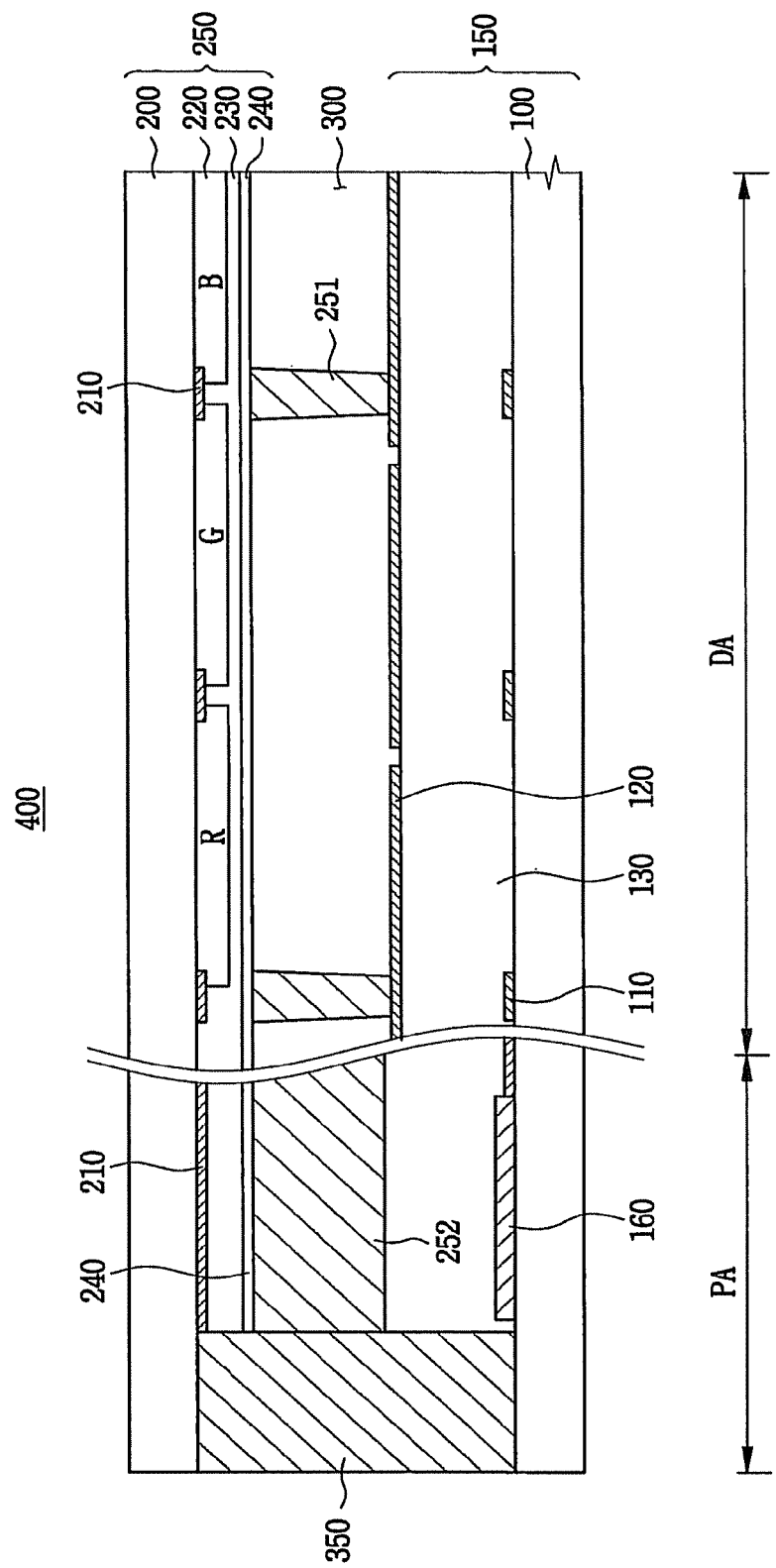
FIG. 3 is a cross-sectional view showing a transmissive type liquid crystal display apparatus according to a first exemplary embodiment of the present invention.
Figure 4:
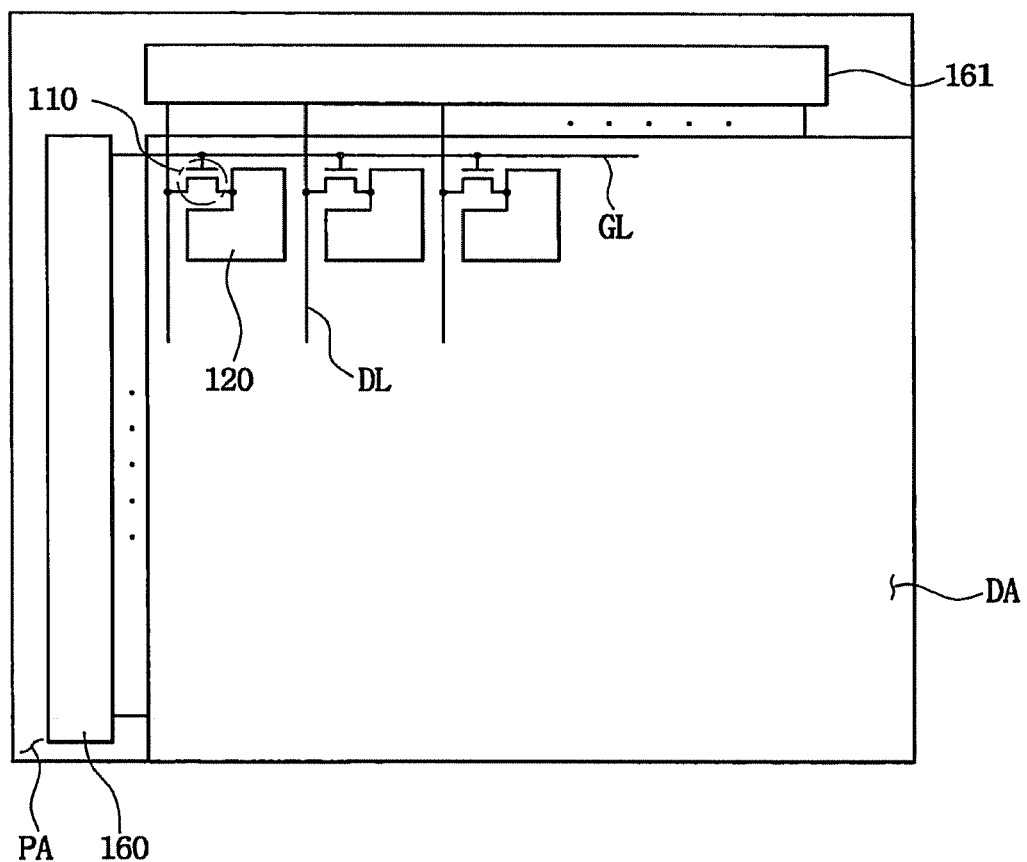
FIG. 4 is a plan view showing an array substrate shown in FIG. 3.
Figure 5:
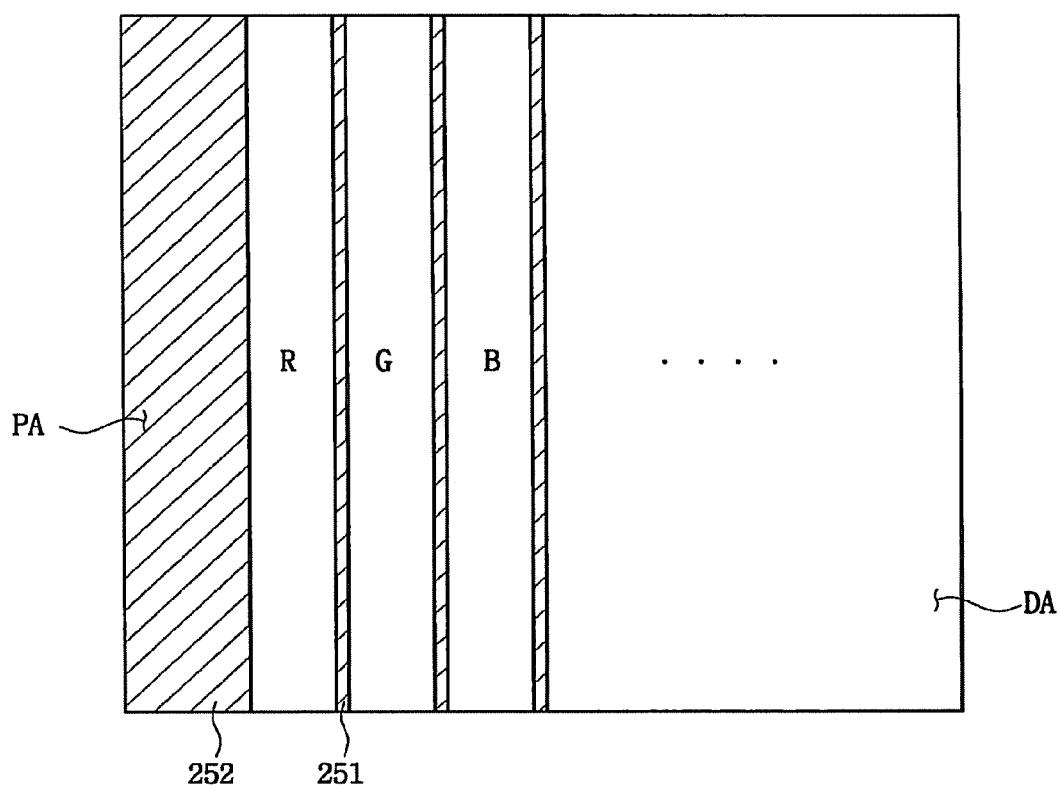
FIG. 5 is a plain view showing a color filter substrate shown in FIG. 3.

FIG. 3 is a cross-sectional view of a transmissive type liquid crystal display apparatus according to a first embodiment of the present invention, FIG. 4 is a plan view of the array substrate shown in FIG. 3, and FIG. 5 is a plain view of the color filter substrate shown in FIG. 3.

Referring to FIGS. 3 and 4, a transmissive type liquid crystal display apparatus 400 according to the first embodiment of the present invention includes a lower substrate (or or an array substrate) 150, an upper substrate (or a color filter substrate) 250 facing the array substrate 150, and a liquid crystal layer 300 interposed between the array substrate 150 and the color filter substrate 250.

The array substrate 150 includes a display region DA for displaying the image, and a peripheral region PA adjacent to the display region DA for applying driving signals to the display region DA. A display part for displaying an image is disposed at the display region DA, and a driving part for driving the display part is disposed at the peripheral region PA.

A plurality of pixels arranged in a matrix shape is formed in the display region DA. Each of the pixel includes a Thin Film Transistor (TFT) that is 110 electrically connected to a data line DL extending in a first direction and a gate line GL extending in a second direction perpendicular to the first direction, and a pixel electrode 120 comprising transparent conductive substance and electrically connected to the thin film transistor 110. In detail, a gate terminal of the thin film transistor 110 is electrically connected to the gate line GL, a source terminal of the thin film transistor 110 is electrically connected to the data line DL, and a drain terminal is electrically connected to the pixel electrode 120.

Referring to FIG. 3, the first organic insulation layer 130 is interposed between the thin film transistor 110 and the pixel electrode 120. A contact hole 131 is formed on the first organic insulation layer 130, so that the drain terminal of the thin film transistor 110 is electrically connected to the pixel electrode 120 via the contact hole 131. The pixel electrode 120 comprises an Indium Tin Oxide (ITO) or Indium Zinc Oxide (IZO).

The portion of the array substrate 150 in which the thin film transistor 110, the data line DL and the gate line GL are formed corresponds to an ineffective display region and the portion of the array substrate 150 in which the pixel electrode 120 is formed corresponds to an effective display region.

In the peripheral region PA of array substrate 150, a gate driving circuit 160 and a data driving circuit 161 are formed. The gate driving circuit 160 is electrically connected to the gate line GL to apply a driving signal to the gate line GL. The gate driving circuit 160 is formed in the peripheral region PA of the array substrate 150 through the manufacturing process of the thin film transistor 110 formed in the display region DA.

The data driving circuit 161 is electrically connected to the data line DL to apply an image signal to the data line DL. The data driving circuit 161 is formed in a chip type and attached to the array substrate 150 when the array substrate 150 is formed completely.

The color filter substrate 250 includes a black matrix 210, a color filter 220, a leveling layer 230 and a common electrode 240.

The black matrix 210 covering the ineffective display region of the array substrate 150 prevents the thin film transistor 110, the data line DL and the gate line GL from reflecting on the screen of the transmissive type liquid crystal display apparatus 400. The black matrix 210 is also formed in the peripheral region PA to prevent the gate driving circuit 160 from reflecting on the screen of the transmissive type liquid crystal display apparatus 400.

As shown in FIG. 3, the color filter 220 is formed in the effective display region of the array substrate 150. The color filter 220 comprises R-color element, G-color element and B-color element. The color filter 220 forms a pixel. A portion of the color filter 220 overlaps with a portion of the black matrix 210.

The leveling layer 230 is deposited on the color filter 220 and black matrix 210 to protect the color filter 220 and black matrix 210 and to level the height difference between the color filter 220 and black matrix 210. On the leveling layer 230, a common electrode 240 comprising of transparent conductive substance is deposited to form a uniform thickness.

After the common electrode 240 is formed on the leveling layer 230, a protection layer 252 and a cell gap retaining member 251 are formed. In detail, the protection layer 252 is formed on the portion of the common electrode 240 facing the gate driving circuit 160, and the cell gap retaining member 251 is formed on the portion of the common electrode 240 facing the black matrix 210 of the display region DA.

The protection layer 252 covers the portion of common electrode 240 facing the gate driving circuit 160 to protect the gate driving circuit 160. Further, the protection layer 252 has lower dielectric constant than the liquid crystal layer 300 to reduce a parasitic capacitance between the gate driving circuit 160 and the common electrode 240. Therefore, the protection layer 252 prevents the gate driving circuit 160 from operating abnormally.

The cell gap retaining member 251 interposed between the array substrate 150 and the color filter substrate 250, maintains the distance of cell gap of the transmissive type liquid crystal display apparatus 400. The cell gap retaining member 251 comprises the photosensitive organic insulation layer, likewise the protection layer 252.

As shown in FIGS. 3 and 5, the cell gap retaining member 251 is formed on the portion of ineffective display region of the Display region DA in order not to influence aperture ratio (effective display region area/total area). The cell gap retaining member 251 has a stripe shape extending in the direction of the data line DL.

A sealing member 350 combines the array substrate 150 and the color filter substrate 250, so that the common electrode 240 and the pixel electrode 120 face each other. Then, a liquid crystal layer 300 is interposed between the array substrate 150 and the color filter substrate 250. From these procedures, a transmissive type liquid crystal display apparatus 400 is completed.

The transmissive type liquid crystal display apparatus 400 has the protection layer 252. The protection layer 252 prevents electrical short of the common electrode 240 and the gate driving circuit 160, and reduces the parasitic capacitance by forming the protection layer 252.

Figure 1:
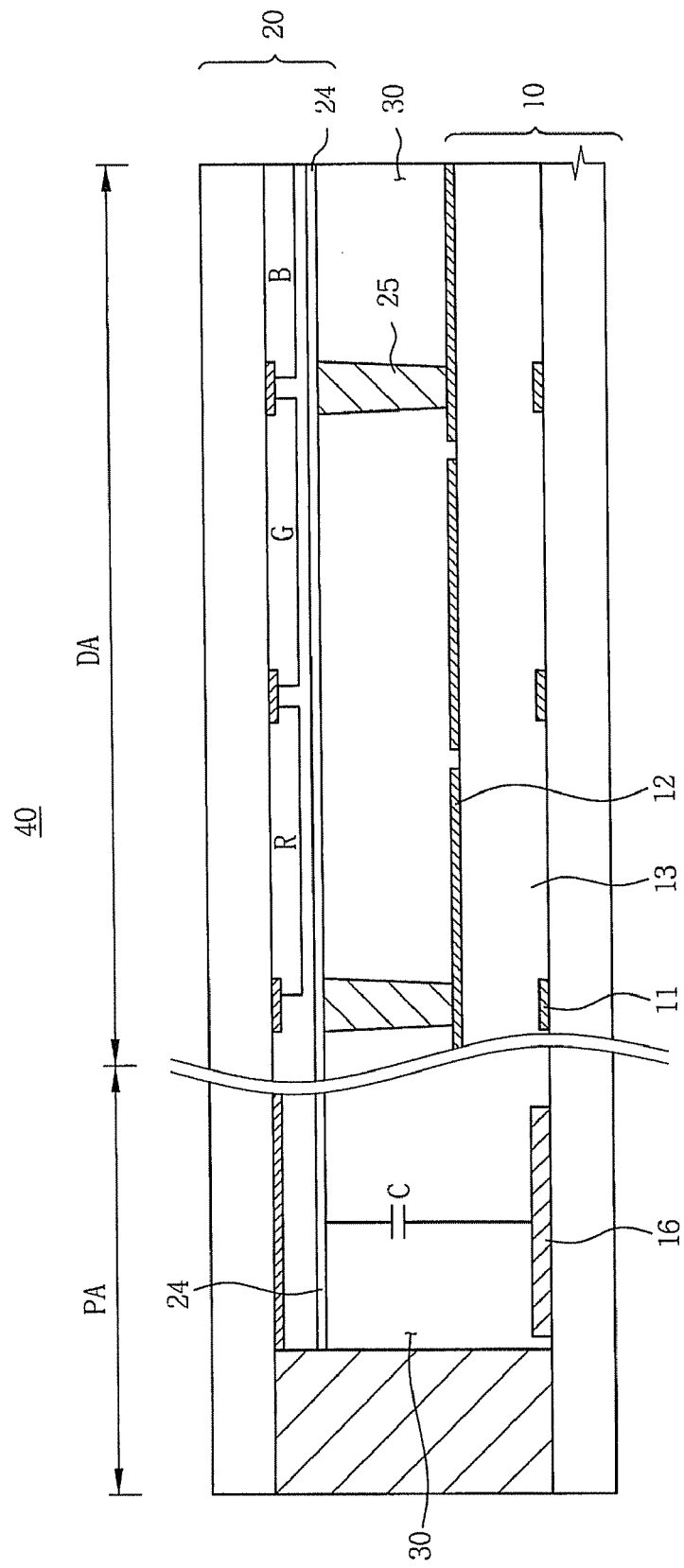
FIG. 1 is a cross-sectional view showing a conventional liquid crystal display apparatus.
Figure 2:
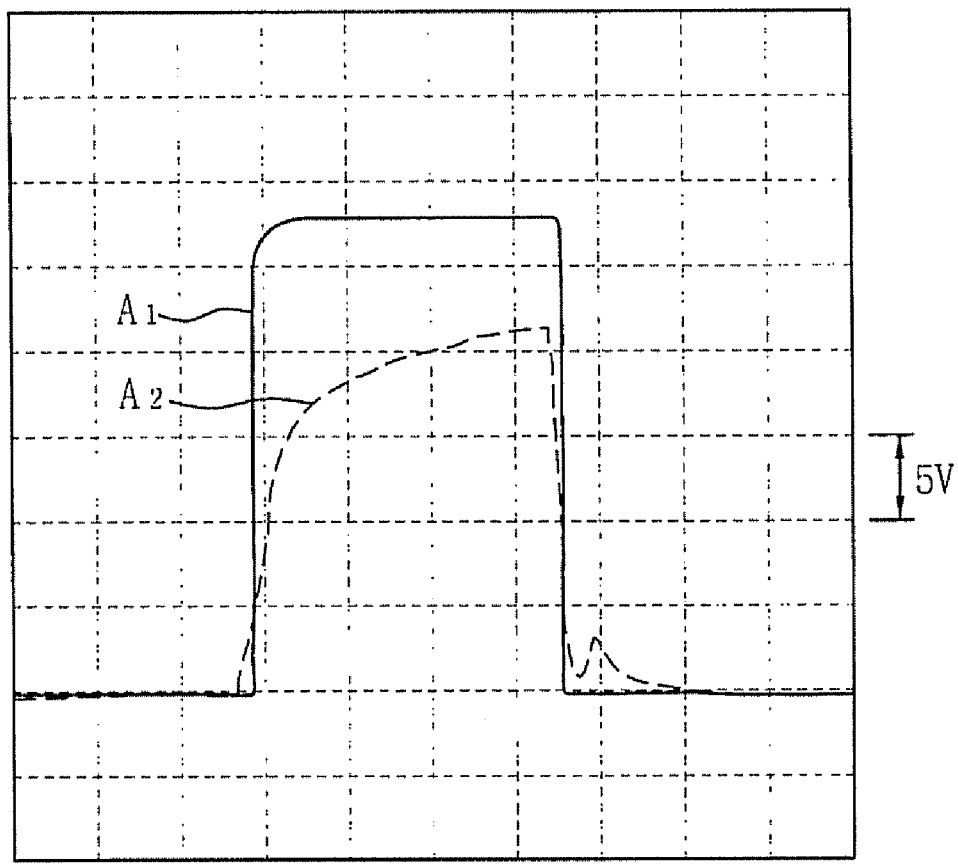
FIG. 2 is an output signal waveform showing a gate-driving circuit shown in FIG. 1.

For example, when the parasitic capacitance of conventional liquid crystal display apparatus 40 of FIG. 1, having the liquid crystal layer 30 between the gate driving circuit 16 and the common electrode 24, is 1.03 pF, the parasitic capacitance of the liquid crystal display apparatus 400 of present invention of FIG. 3, having protection layer 252 between the gate driving circuit 160 and the common electrode 240, is 0.34 pF which is 66.67% lower than that of conventional. The capacitance is directly proportional to a dielectric constant. Thus, the protection layer 252 having a lower dielectric constant than liquid crystal layer 300 reduces the parasitic capacitance.

In FIG. 3, the first organic insulation layer 130 is interposed between the thin film transistor 110 and the pixel electrode 120. However, an inorganic insulation layer (not shown) may be interposed between the thin film transistor 110 and the pixel electrode 120. Further, no layer may be interposed between the thin film transistor 110 and the pixel electrode 120.

FIGS. 6A, 6B, 6C and 6D are cross-sectional views illustrating processes of manufacturing the color filter substrate shown in FIG. 3.

Figure 6A:
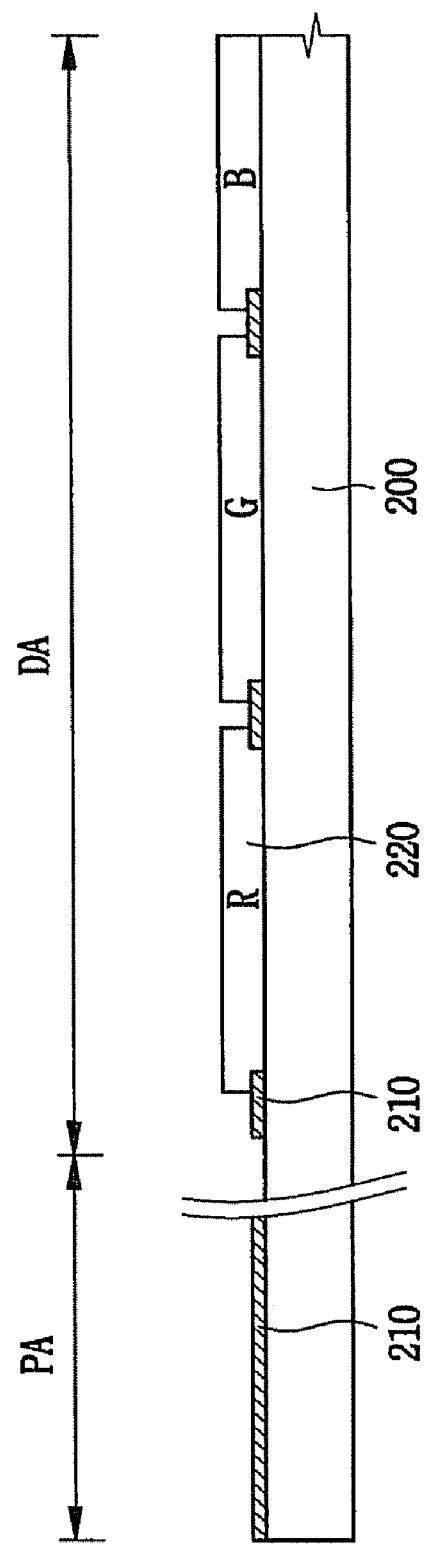

Referring to FIG. 6A, a chrome oxide ($CrO_2$) layer or an organic black matrix layer is deposited on the color filter substrate 250. The chrome oxide ($CrO_2$) layer or the organic black matrix layer deposited on the color filter substrate 250 is patterned, so that a black matrix 210 is formed in the ineffective display region of the display region DA and in the peripheral region PA.

On the color filter substrate 250 where the black matrix 210 is formed, a first photo-resistor (not shown) having red dyes is deposited and patterned, so that a R-color element is formed. A second photo-resistor (not shown) having green dyes is deposited on the color filter substrate 250 and patterned to form a G-color element. Then a third photo-resistor (not shown) having blue dyes is deposited on the color filter substrate 250 and patterned to form a B-color element. The color elements are formed in turn, as described above, so that the color filter substrate 250 is completed. Each of the R.G.B. color element is formed in the effective display region and overlaps with the black matrix 210.

Figure 6B:
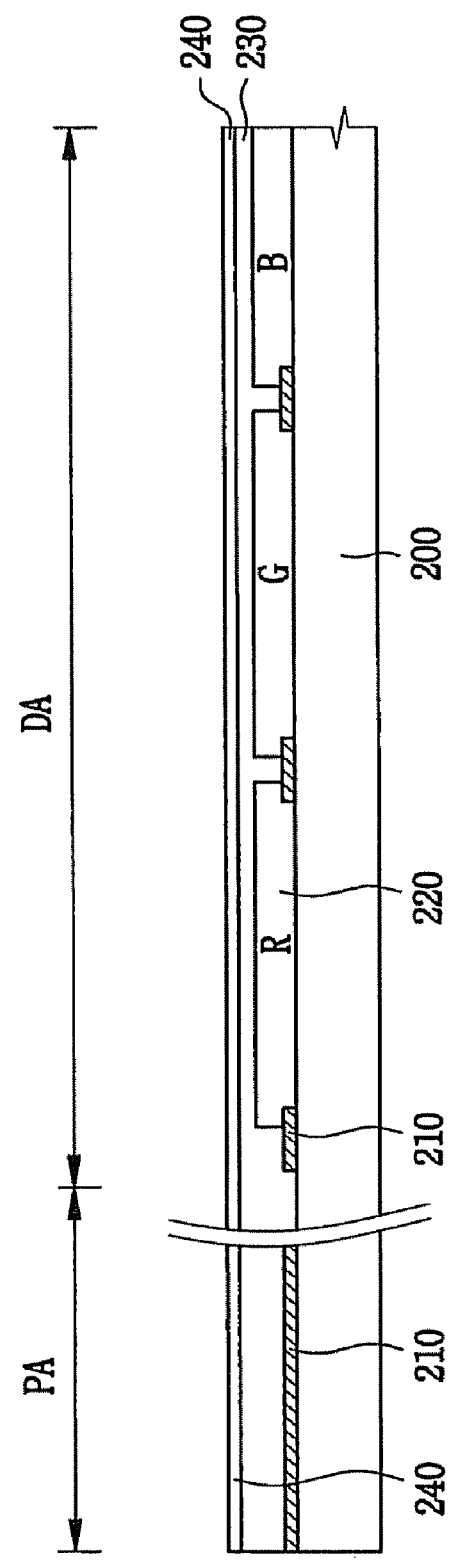

Referring to FIG. 6B, a leveling layer 230 comprising photosensitive acryl resin or polyimide resin is deposited on the black matrix 210 and the color filter 220. Then, the common electrode 240 is formed on the leveling layer 230.

The leveling layer 230 levels a height difference between the black matrix 210 and the color filter 220, so that the common electrode 240 has plat surface in spite of the black matrix 210 and color filter 220.

Then, the common electrode 240 comprising Indium Tin Oxide (ITO) or Indium Zinc Oxide (IZO), is formed to have uniform thickness on the leveling layer 230.

Figure 6D:
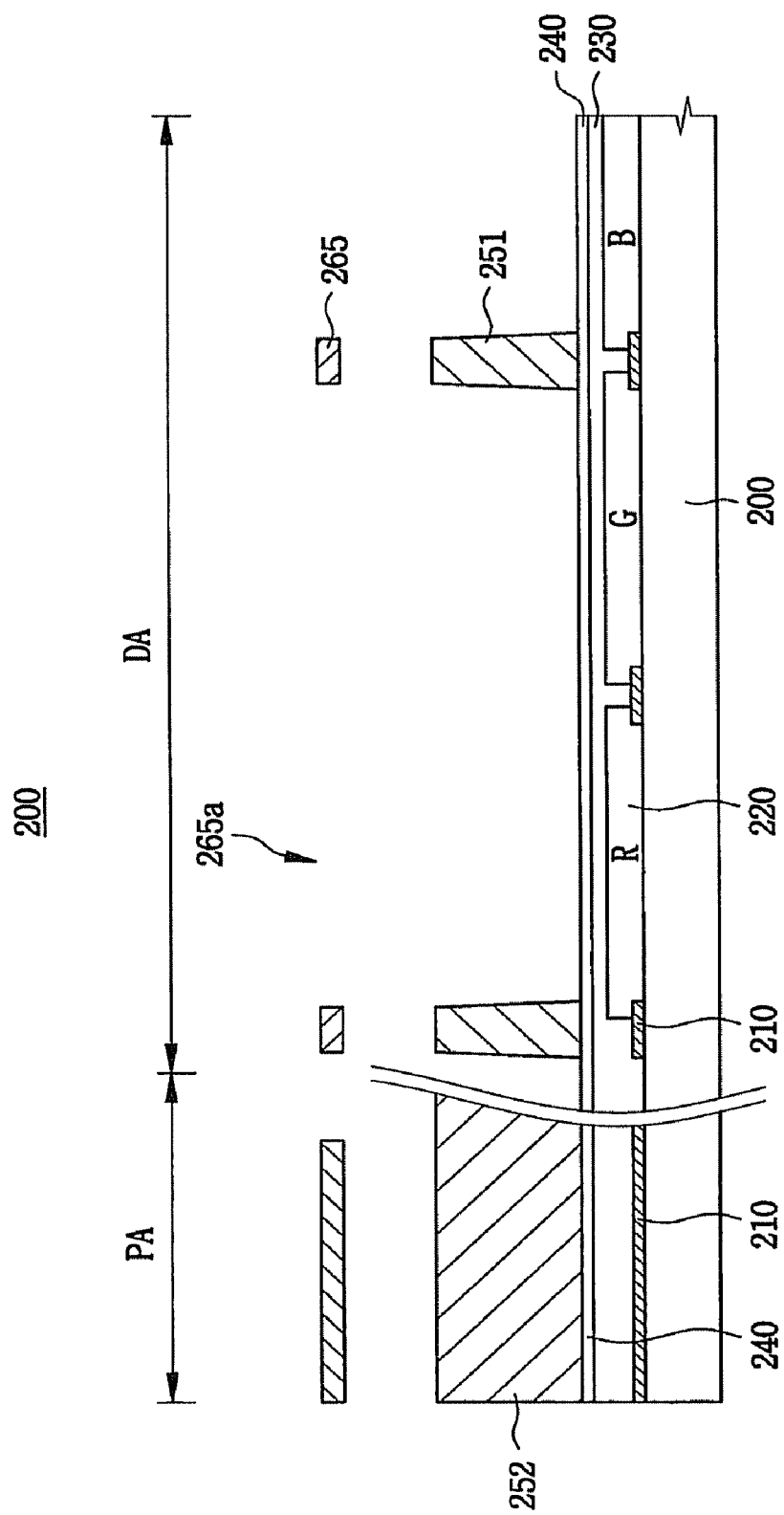

Referring to FIGS. 6C and 6D, a second organic insulation layer 260 comprising photosensitive acryl resin is deposited on the common electrode 240 to have a predetermined thickness. The thickness of the second organic insulation layer 260 determines the cell gap of the transmissive type liquid crystal display apparatus 400.

On the second organic insulation layer 260, a photomask 265 having a pattern corresponding to a cell gap retaining member 251 and a protection layer 252, is placed. The photomask 265 has openings 265a corresponding to the region where the cell gap retaining member 251 and the protection layer 252 do not exist. Then, the second organic insulation layer 260 having the photomask 265 disposed on is exposed.

When the second organic insulation layer 260 is treated with developing solution, the cell gap retaining member 251 and the protection layer 252 are formed in the display region DA and in the peripheral region PA respectively.

Embodiment 2

Figure 7:
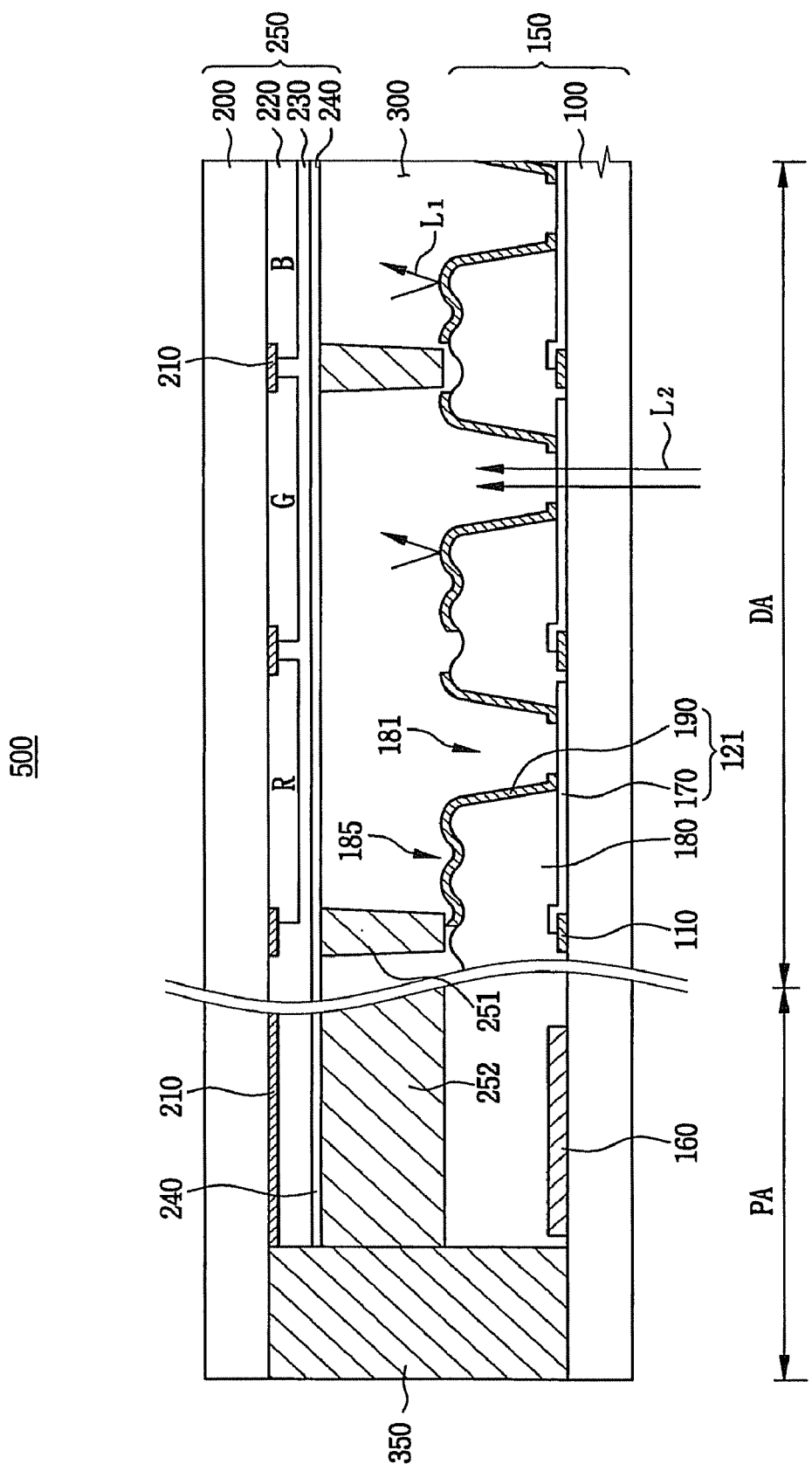
FIG. 7 is a cross-sectional view showing a reflective and transmissive type liquid crystal display apparatus according to a second exemplary embodiment of the present invention.
Figure 8:
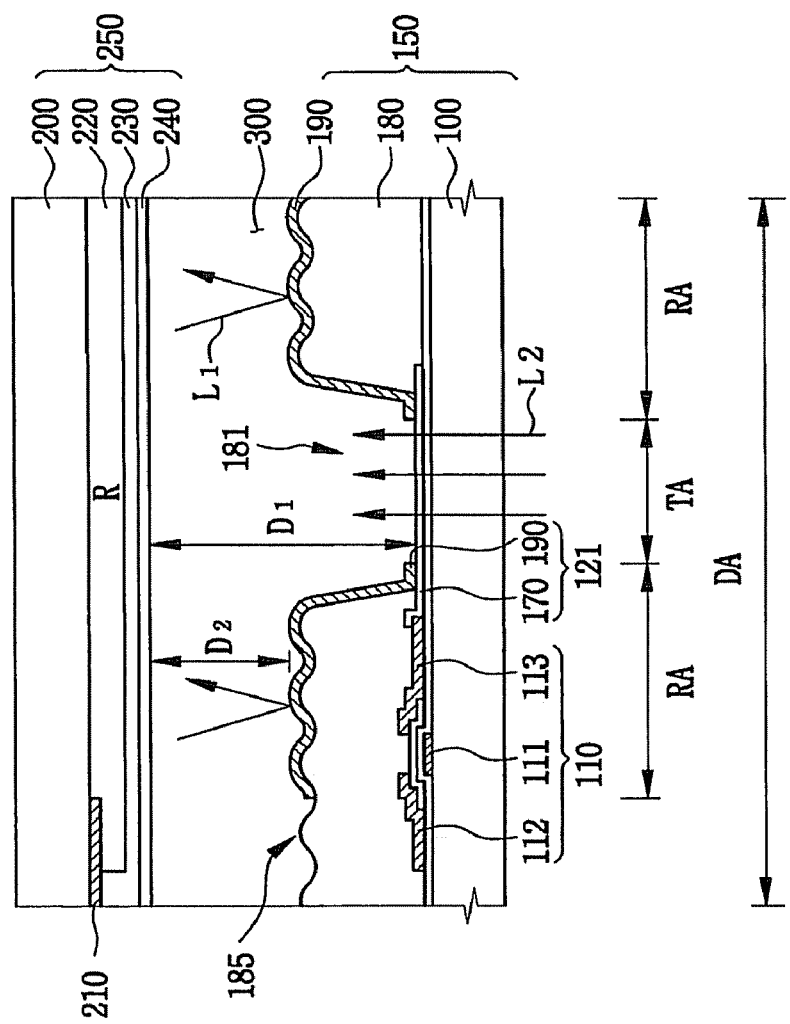
FIG. 8 is a cross-sectional view showing a display part shown in FIG. 7.

FIG. 7 is a cross-sectional view of a reflective and transmissive type liquid crystal display apparatus according to the second embodiment of the present invention, and FIG. 8 is a cross-sectional view of display part shown in FIG. 7. The liquid crystal display apparatus of the present embodiment is same as in Embodiment 1 except for a pixel electrode. Thus, the same reference numerals will be used to refer to the same or like parts as those described in Embodiment 1 and any further explanation will be omitted.

Referring to FIGS. 7 and 8, a reflective and transmissive type liquid crystal display apparatus 500 according to the second embodiment of the present invention includes an array substrate 150, a color filter substrate 250 facing with the array substrate 150, and liquid crystal layer 300 interposed between the array substrate 150 and the color filter substrate 250.

The array substrate 150 includes a display region DA and a peripheral region PA adjacent to the display region DA.

As shown in FIG. 8, a thin film transistor 110 and a pixel electrode are formed in the display region DA. The pixel electrode includes a transparent electrode 170 and a reflection electrode 190. The transparent electrode 170 is electrically connected to the thin film transistor 110. The thin film transistor 110 includes a gate terminal 111, a source terminal 112 and a drain terminal 113. The drain terminal 113 of the thin film transistor 110 is electrically connected to the transparent electrode 170 comprising Indium Tin Oxide (ITO) to apply signals to the transparent electrode 170.

An organic insulation layer 180 comprising photosensitive acryl resin is deposited on the thin film transistor 110 and the transparent electrode 170 with predetermined thickness. The organic insulation layer 180 covers the connection part of the drain terminal 113 and the transparent electrode 170. The organic insulation layer 180 also has an opening window 181 to expose of some part of the transparent electrode 170. The opening window 181 is formed in a region where the thin film transistor 110 is not formed.

A surface 185 of the organic insulation layer 180 is formed unevenly to enhance the reflection efficiency of a reflection electrode 190 formed on the organic insulation layer 180.

The reflection electrode 190 comprises of substances having good reflection efficiency such as aluminum (Al), Silver (Ag) and Chrome (Cr). The reflection electrode 190 is deposited on the organic insulation layer 180 to form a uniform thickness. The reflection electrode 190 is electrically connected to the transparent electrode 170 through the opening window 181, so that a signal of the drain terminal 113 is applied to the reflection electrode 190 through the transparent electrode 170.

The reflection electrode 190 is electrically connected to the transparent electrode 170 through the opening window 181, so that a contact for connecting the reflection electrode 190 and the transparent electrode 170 is needless. Therefore the reflection efficiency is enhanced.

The reflection electrode 190 is deposited not only on the top surface but also on the side surface of the organic insulation layer 180. Therefore, the reflection efficiency is enhanced more.

A region where the reflection electrode 190 is formed is a reflection region RA for reflecting a first light L1 incident from the front of the reflective and transmissive type liquid crystal display apparatus 500. A region where the transparent electrode 170 is exposed through the opening window 181 is a transmission region TA for transmitting the second light L2 incident from the back of the reflective and transmissive type liquid crystal display apparatus 500.

The reflective and transmissive type liquid crystal display apparatus 500 has the first cell gap D1 of the transmission region TA and the second cell gap D2 of the reflection region RA. The first cell gap D1 is double of the second cell gap D2, so that the first light L1 advances same distance as the second light L2. Namely, the reflective and transmissive type liquid crystal display apparatus 500 has double cell gap structure having different cell gap in the transmission region TA and the reflection region RA.

A liquid crystal layer 300 includes a first liquid crystal (not shown) adjacent to the color filter substrate 250 and a second liquid crystal (not shown) adjacent to the array substrate 150. An array angle of the first liquid crystal and the second liquid crystal, or an angle formed by the long axis of the first liquid crystal and the second liquid crystal, is defined as a twisted angle of the liquid crystal layer 300.

As the twisted angle increases, the transmission efficiency of the reflective and transmissive type liquid crystal display apparatus 500 decreases. Therefore, the reflective and transmissive type liquid crystal display apparatus 500 has double cell gap structure having the first gap D1 of the transmission region TA twice broader than the second gap of the reflection region RA, in order to prevent the light loss due to the polarization. The liquid crystal layer 300 has homogeneous alignment having 0° twisted angle to enhance the transmission efficiency.

Embodiment 3

Figure 9:
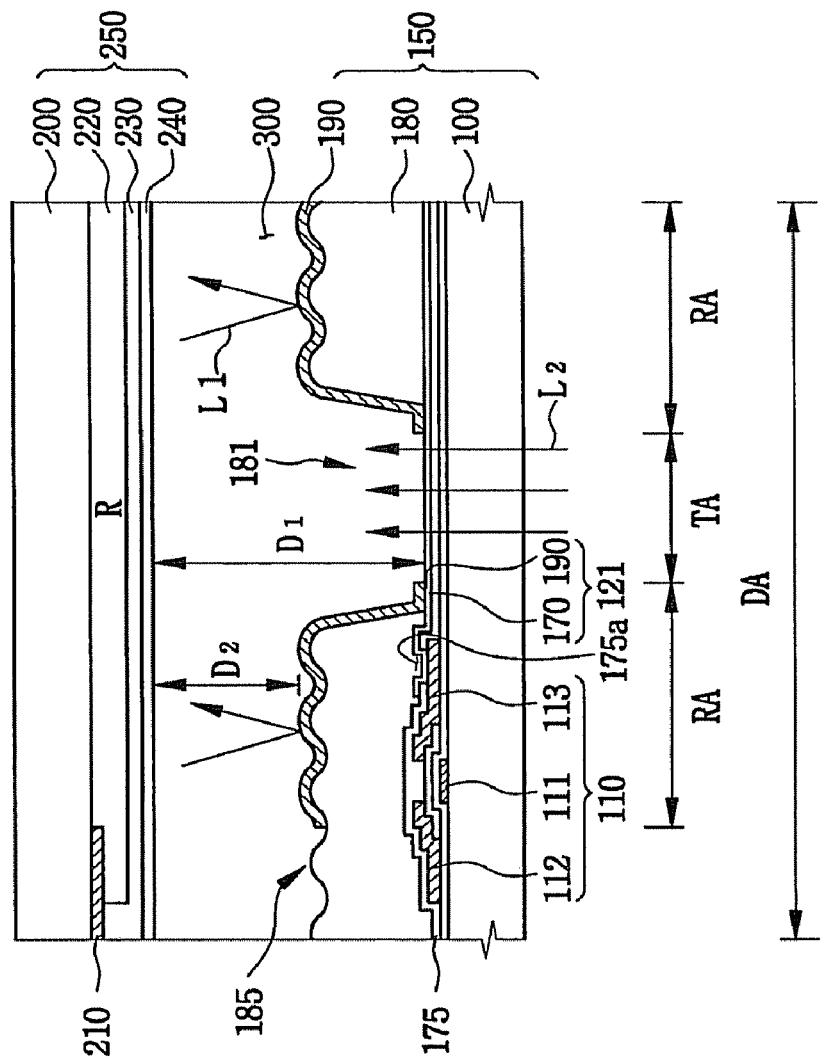
FIG. 9 is a cross-sectional view showing a display part of a reflective and transmissive type liquid crystal display apparatus according to a third exemplary embodiment of the present invention.

FIG. 9 is a cross-sectional view of a display part of a reflective and transmissive type liquid crystal display apparatus according to the third embodiment of the present invention.

Referring to FIG. 9, the array substrate 150 of the display region DA includes a thin film transistor 110, a pixel electrode, an inorganic insulation layer 175, and an organic insulation layer 180. The pixel electrode includes a transparent electrode 170 and reflection electrode 190.

In detail, after the thin film transistor 110 including a gate terminal 111, source terminal 112 and drain terminal 113 is formed on the array substrate 150. The inorganic insulation layer 175 is deposited for protecting the thin film transistor 110. The inorganic insulation layer 175 comprises transparent inorganic compound such as silicon nitride (SiNx) or chrome oxide ($Cr_2O_3$). The inorganic insulation layer 175 includes a contact hole 175a for exposure of the drain terminal 113.

Then, a transparent electrode 170 is formed on the insulation layer 175 and the transparent electrode 170 is electrically connected to the drain terminal 113 through the contact hole 175a. Therefore, a signal of the drain terminal is applied to the transparent electrode 170.

Then, an organic insulation layer 180 is deposited on the array substrate 150 on which the thin film transistor 110, inorganic insulation layer 175 and the transparent electrode 170 are formed. An opening window 181 is formed on the organic insulation layer 180 to expose a part of the transparent electrode 180. The opening window 181 is formed in the region where the thin film transistor is not formed to enhance the reflection efficiency.

Then, a reflection electrode 190 is formed on the organic insulation layer 180 to form a uniform thickness. The reflection electrode 190 is electrically connected to the transparent electrode 170 through the opening window 181. Therefore, a signal of the drain terminal 113 is applied to the reflection electrode 190 by the transparent electrode 170.

Referring to FIG. 7 again, a gate driving circuit 160 is formed on the array substrate 150 of the peripheral region PA. The gate driving circuit 160 is electrically connected to the gate line GL, so that the gate driving circuit 160 applies gate driving signal to the gate line GL. The gate driving circuit 160 is formed in the driving part DA of the array substrate 150 through process of manufacturing the thin film transistor 110 formed in the display part PA.

The color filter substrate 250 includes a black matrix 210, a color filter 220 having R.G.B color elements, a leveling layer 230, a common electrode 240 comprising transparent conductive substance, a protection layer 252 and cell gap retaining member.

In detail, the protection layer 252 and cell gap retaining member 251 are deposited on the color filter substrate 250 on which the common electrode 240 is already formed. The protection layer 252 is deposited on the common electrode 240 of the peripheral region PA, facing the gate driving circuit 160. The cell gap retaining member is formed on the common electrode 240 of the display region DA.

The protection layer 252 covers the common electrode 240 facing the gate driving circuit 160 to insulate the common electrode 240 and the gate driving circuit 160. Namely, the protection layer 252 is a photosensitive insulation layer having a lower dielectric constant than the liquid crystal layer 300. The protection layer 252 prevents the electrical short of the gate driving circuit 160 and the common electrode 240, and reduces the parasitic capacitance between the gate driving circuit 160 and the common electrode 240.

The cell gap retaining member 251 is interposed between the array substrate 150 and the color filter substrate 250 to maintain the distance of a cell gap. The cell gap retaining member 251 and the protection layer 252 may be formed together with from the photosensitive organic insulation layer.

Embodiment 4

Figure 10:
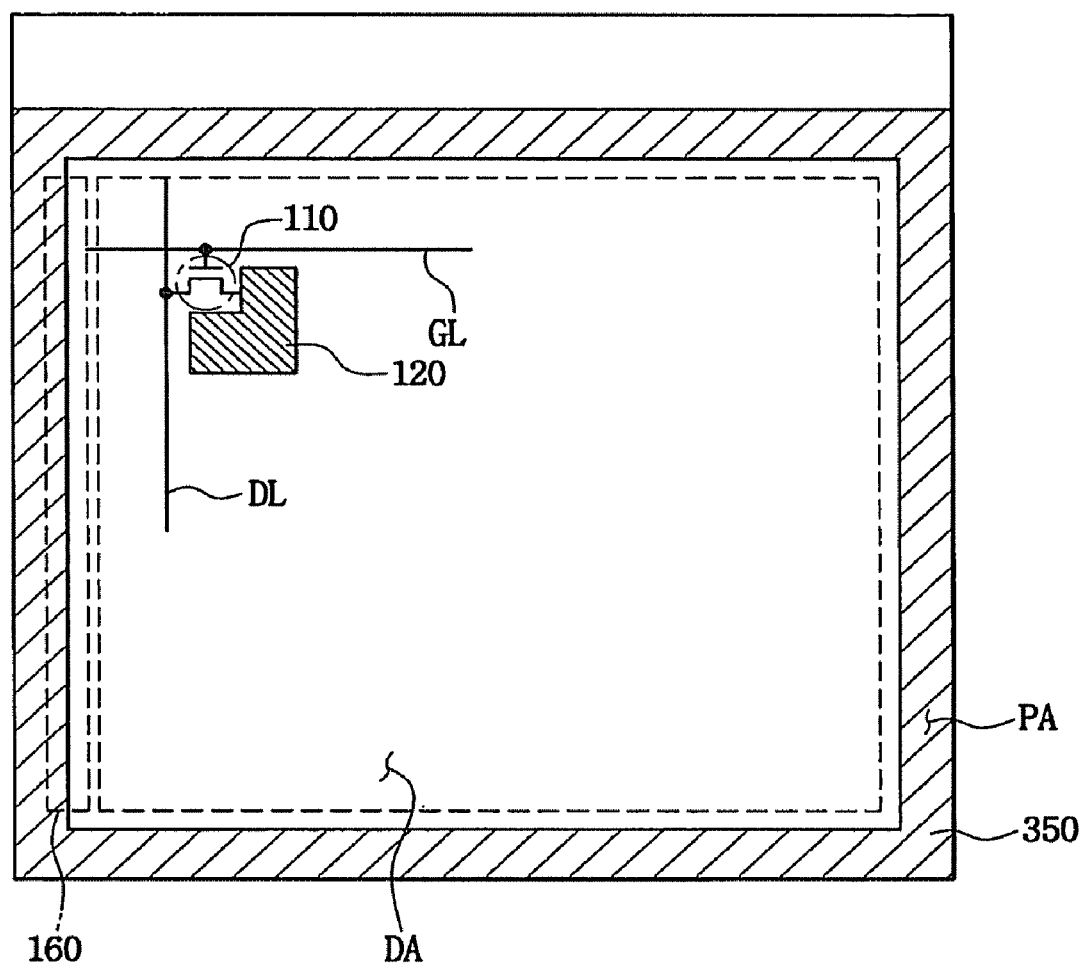
FIG. 10 is a plan view showing a liquid crystal display apparatus according to a fourth exemplary embodiment of the present invention.
Figure 11:
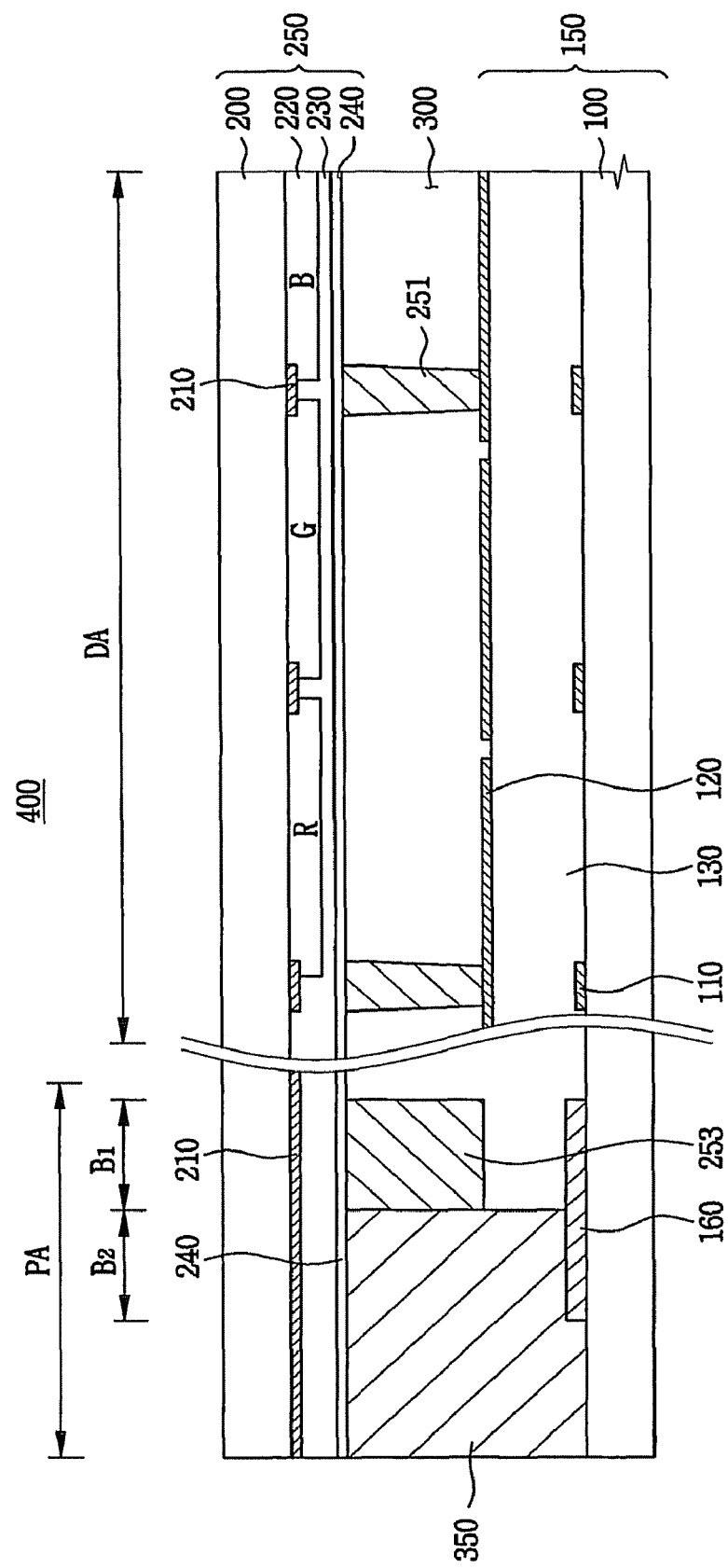
FIG. 11 is a cross-sectional view showing a liquid crystal display apparatus of FIG. 10.

FIG. 10 is a plan view showing a liquid crystal display apparatus according to a fourth exemplary embodiment of the present invention, and FIG. 11 is a cross-sectional view showing a liquid crystal display apparatus of FIG. 10.

Referring to FIGS. 10 and 11, a color filter substrate 250 includes a black matrix 210, a color filter 220, a leveling layer 230 and a common electrode 240.

The color filter 220 includes R.G.B pixels displaying red-color, green color and blue color, respectively. The black matrix 210 is formed in a display region, such that the black matrix surrounds the R.G.B pixels. The black matrix 210 faces the gate driving circuit 160 formed on an array substrate.

The leveling layer 230 reduces a height difference between the black matrix 210 and the color filter 220. That is, the leveling layer 230 levels the surface of the color filter substrate 250.

The common electrode is formed on the leveling layer 230. A cell gap retaining member 251 and insulating member 253 are formed on the common electrode. The cell gap retaining member 251 is formed in the display region DA, such that the cell gap retaining member 251 maintains a cell gap between the array substrate 150 and the color filter substrate 250. The insulating member 253 is formed in a first region B1 of the peripheral region PA, and the insulating member 253 is interposed between the common electrode 240 and the gate driving circuit 160.

The gate insulating member 253 has a lower dielectric constant than the liquid crystal layer 300. For example, the cell gap retaining member 251 and the insulating member 253 may comprise an organic insulation layer, such as acrylic resin, polyimide resin, etc.

An assembling member (hereinafter, referred to as sealant) 350 assembles the array substrate 150 and the color filter substrate 250. The sealant 350 is formed in a second region B2 of the peripheral region PA. The sealant 350 has a lower dielectric constant than the liquid crystal layer 300.

Then, a liquid crystal material is injected into between the array substrate 150 and the color filter substrate 250 to form the liquid crystal layer 300. The liquid crystal layer 300 is not formed in a second region B2 where the gate driving circuit 160 is formed.

Further, the liquid crystal layer 300 is thinner at the first region B1 than at the display region DA, or the liquid crystal layer 300 may not be formed at the first region B1. Thus, the insulating member 253 and the sealant 350 insulate the common electrode 240 from the gate driving circuit 160, and the insulating member 253 and the sealant 350 reduces a parasitic capacitance between the common electrode 240 and the gate driving circuit 160.

A capacitance is directly proportional to the dielectric constant. Thus, when the insulating member 253 and the sealant 350 having a lower dielectric constant than the liquid crystal layer 300 are interposed between the common electrode 240 and the gate driving circuit 160, the parasitic capacitance between the common electrode 240 and the gate driving circuit 160 is reduced to decrease malfunction of the gate driving circuit 160.

Figure 12:
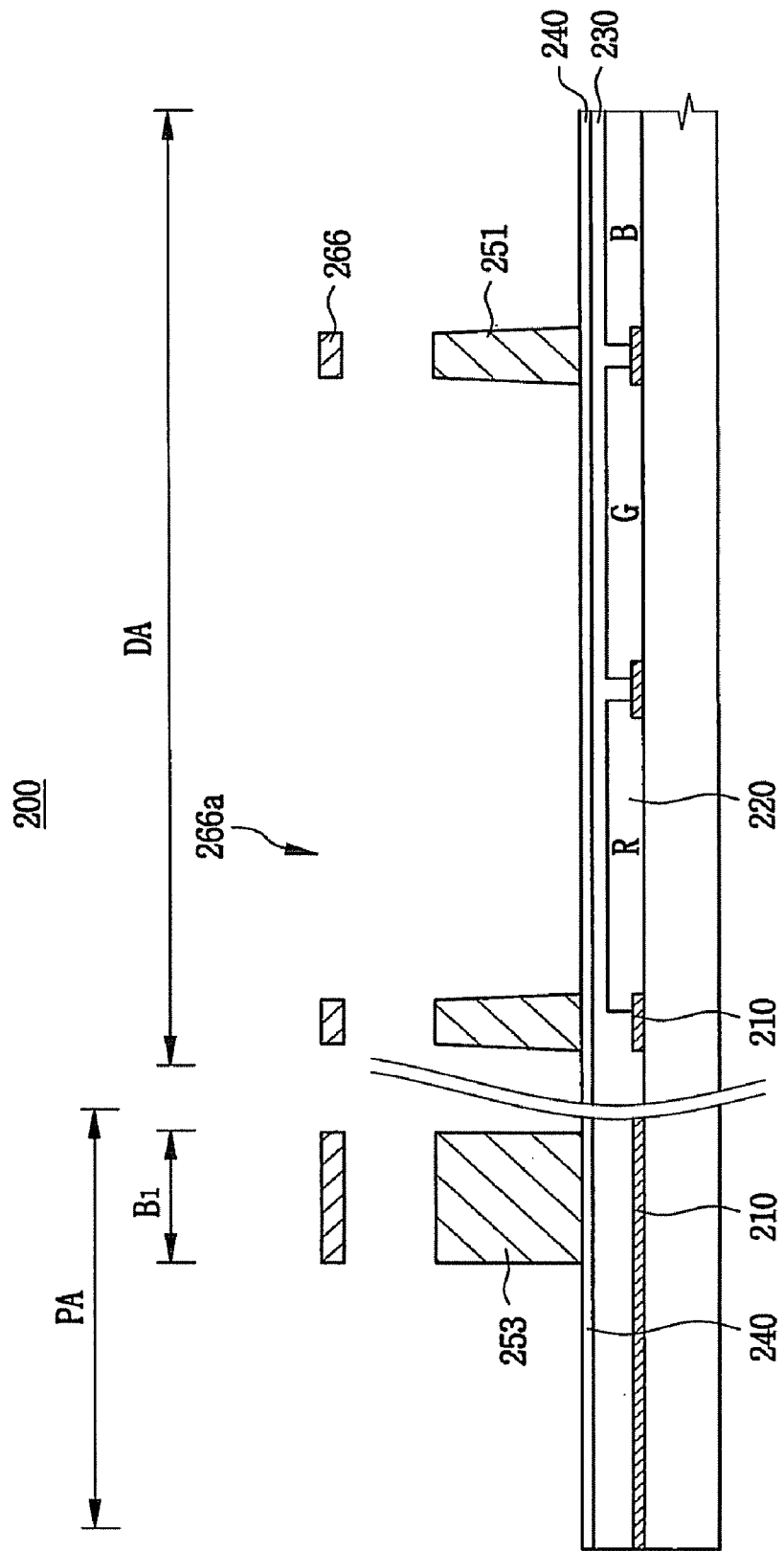
FIG. 12 is a cross-sectional view showing a process of manufacturing a color filter of FIG. 11.

FIG. 12 is a cross-sectional view showing a process of manufacturing a color filter of FIG. 11.

Referring to FIG. 12, when a common electrode 240 is formed on a leveling layer 230, a photosensitive layer (not shown), for example, such as acryl resin, and polyimide, etc. are formed on the common electrode 240.

Then, a mask 266 having patterns corresponding to a cell gap retaining member 251 and the insulating layer 253 is disposed over the photosensitive layer. When the photosensitive layer is positively photosensitive, the mask 266 has openings 266a except for a region corresponding to the cell gap retaining member 251 and the insulating layer 253. On the contrary, when the photosensitive layer is negatively photosensitive, the mask 266 has openings corresponding to the cell gap retaining member 251 and the insulating layer 253.

Then, the photosensitive layer is exposed, and developed, so that the cell gap retaining member 251 and the insulating layer 253 are formed in the display region DA and the peripheral region PA, respectively. The insulting layer 253 corresponds to a gate driving circuit 160 formed on a first region B1 of an array substrate of FIG. 10. Thus, the color filter substrate 250 is completed.

Referring again to FIGS. 10 and 11, the color filter substrate 250 formed via above explained process is assembled with the array substrate 150 by the sealant 350.

The sealant 350 is formed in the peripheral region PA, such that the sealant 350 covers a second region B2 of the peripheral region PA.

As described above, the insulating layer 253 and the sealant 251 insulate the common electrode 240 from the gate driving circuit 160 to reduce a parasitic capacitance between the common electrode 240 and the gate driving circuit 160.

Embodiment 5

Figure 13:
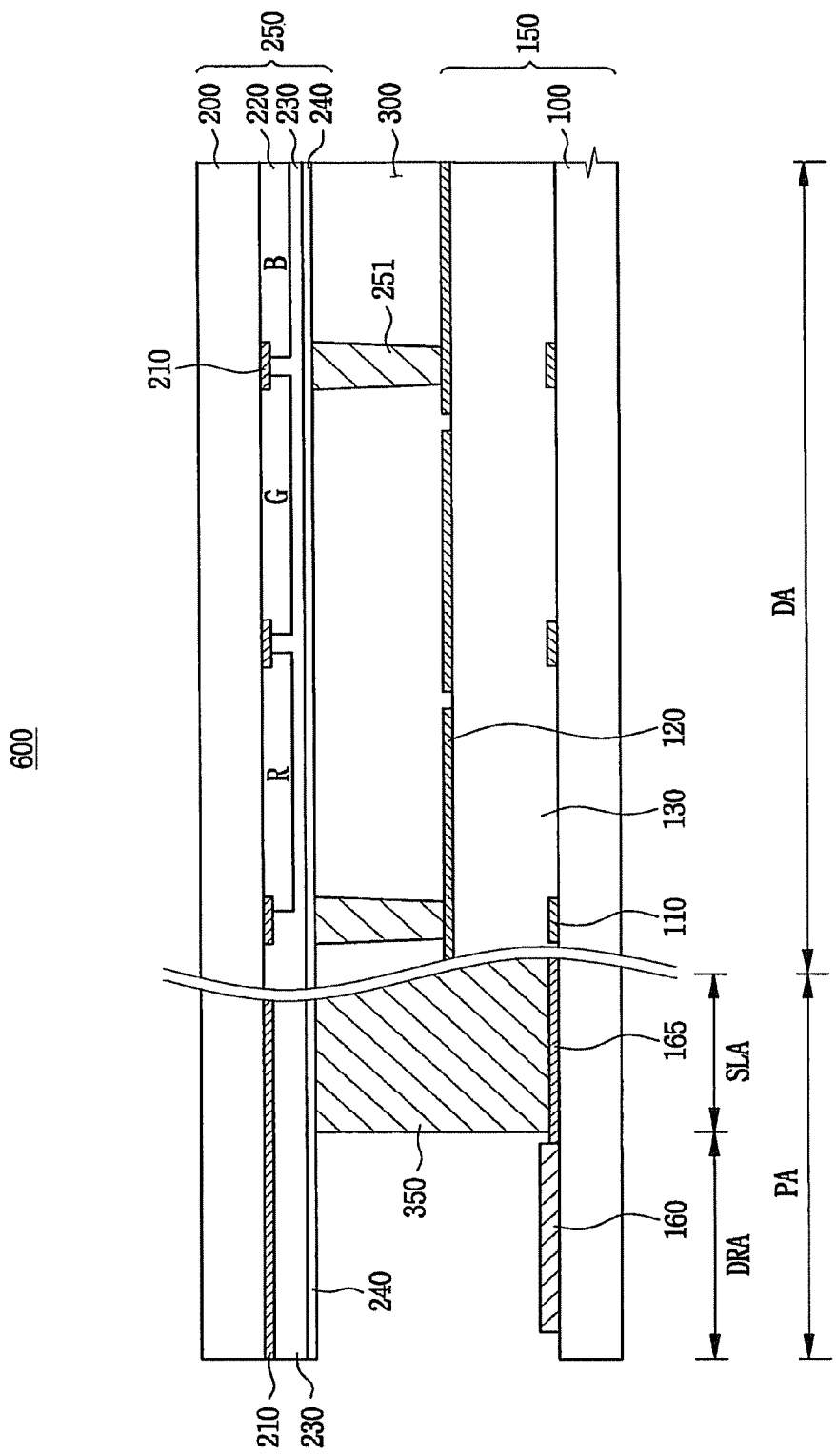
FIG. 13 is a cross-sectional view showing a transmissive type liquid crystal display apparatus according to a fifth exemplary embodiment of the present invention.
Figure 14:
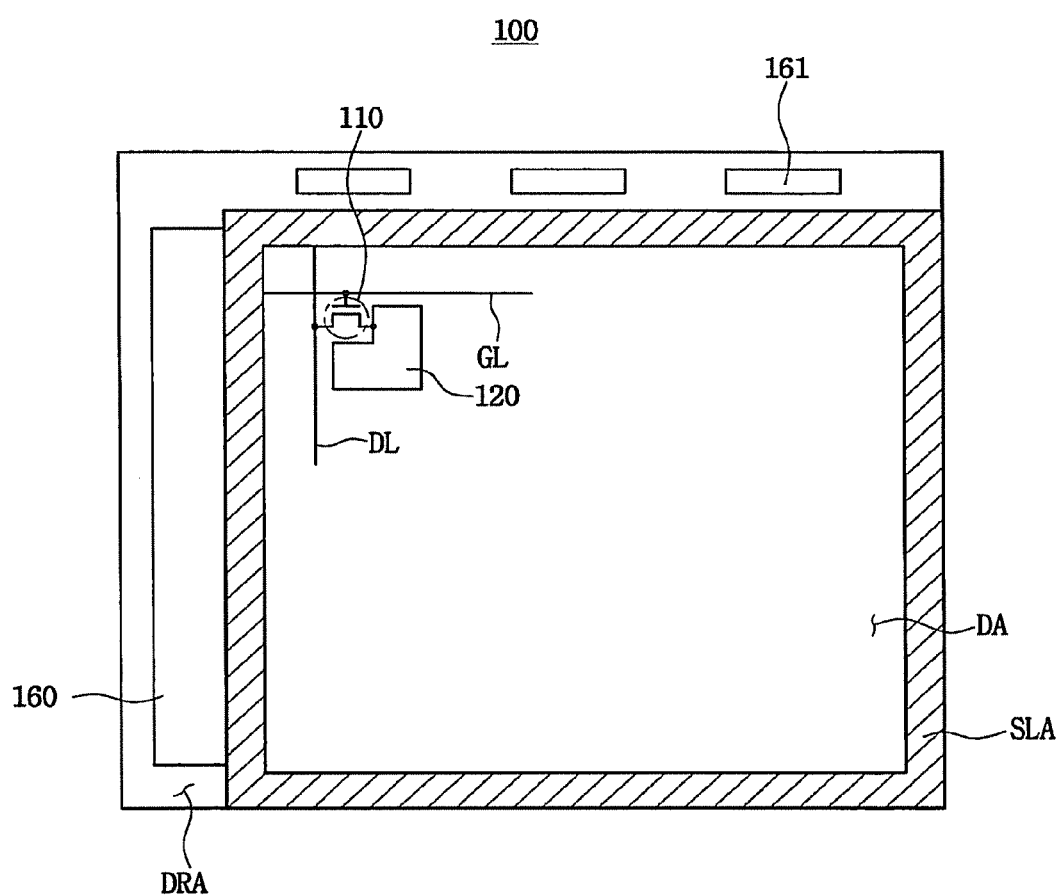
FIG. 14 is a schematic plan view showing an array substrate of FIG. 13.

FIG. 13 is a cross-sectional view showing a transmissive type liquid crystal display apparatus according to a fifth exemplary embodiment of the present invention, and FIG. 14 is a schematic plan view showing an array substrate of FIG. 13.

Referring to FIGS. 13 and 14, a transmissive type liquid crystal display apparatus 600 according to a fifth exemplary embodiment of the present invention includes an array substrate 150, a color filter substrate 250, a liquid crystal layer 300 and a sealant 350. The color filter substrate 250 faces the array substrate 150. The liquid crystal layer 300 is interposed between the array substrate 150 and the color filter substrate 250. The sealant 350 combines the array substrate 150 and the color filter substrate 250.

The array substrate 150 includes a display region DA for displaying an image, and a peripheral region PA disposed adjacent to the display region DA.

The display region DA includes a plurality of pixels arranged in a matrix shape. Each of pixels includes a thin film transistor 110 and a pixel electrode 120. The thin film transistor 110 is electrically connected to a data line DL extending in a first direction, and a gate line GL extending in a second direction that is substantially perpendicular to the first direction. The pixel electrode 120 comprises a material that is electrically conductive and optically transparent.

In detail, the thin film transistor 110 includes a gate electrode that is electrically connected to the gate line GL, a source electrode that is electrically connected to the data line DL, and a drain electrode that is electrically connected to the pixel electrode 120.

The peripheral region PA includes a driving region DRA and a seal line region SLA. A driving circuit 160 for displaying an image via the driving region DRA is disposed in the driving region DRA. The seal line region SLA surrounds the display region DA.

A gate driving circuit 160 and the data driving circuit 170 are formed in the driving region DRA of the array substrate 150. The gate driving circuit 160 is electrically connected to a gate line GL disposed in the display region DA via the connection wiring 165 that is disposed in the seal line region SLA.

Thus, the gate driving circuit 160 provides the gate line GL with gate driving signals. The gate driving circuit 160 is formed via a process through which the thin film transistor 110. That is, the gate driving circuit 160 and the thin film transistor 110 are formed via a same process.

The data driving circuit 170 is electrically connected to the data line DL so as to apply an image signal (or data signal) to the data line DL. The data driving circuit 170 are formed in a chip. Thus, when the array substrate 150 is formed completely, the chip corresponding to the data driving circuit 170 is mounted on the array substrate 150.

The color filter substrate 250 includes a black matrix 210, a color filter 220, a leveling layer 230 and a common electrode 240. When the black matrix 210 and the color filter 220 are formed, a leveling layer 230 is formed on the black matrix 210 and the color filter 220. Then, a common electrode 240 is formed on the leveling layer 230. The common electrode 240 comprises a material that is electrically conductive and optically transparent.

A cell gap retaining member 251 is interposed between the color filter substrate 250 and the array substrate 150. The cell gap retaining member 251 is formed on the common electrode 240, and the cell gap retaining member 251 keeps the color filter substrate 250 away from the array substrate 150.

The sealant 350 combines the array substrate 150 and the color filter substrate 250 at the seal line region SLA. When each of the array substrate 150 and the color filter substrate 250 is formed, the sealant 350 combines the array substrate 150 and the color filter substrate 250. Then, the common electrode 240 faces the pixel electrode 120 at the display region DA, and the common electrode 240 faces the gate driving circuit 160 at the peripheral region PA.

The sealant 350 of the seal line region SLA does not cover the gate driving circuit 160, so that the gate driving circuit 160 is exposed. Further, the liquid crystal layer 300 is not interposed between the gate driving circuit 160 and the common electrode 240.

A parasitic capacitance between the common electrode 240 an the gate driving circuit 160 is directly proportional to a dielectric constant of a material interposed between the common electrode 240 and the gate driving circuit 160, and air has much lower dielectric constant than the liquid crystal layer 300. Thus, when the air is interposed between the common electrode 240 and the gate driving circuit 160, the parasitic capacitance between the common electrode 240 and the gate driving circuit 160 is reduced.

An protection layer of which dielectric constant is lower than the liquid crystal layer 300 may be interposed between the common electrode 240 and the gate driving circuit 160 so as to protect the gate driving circuit 160.

Embodiment 6

Figure 15:
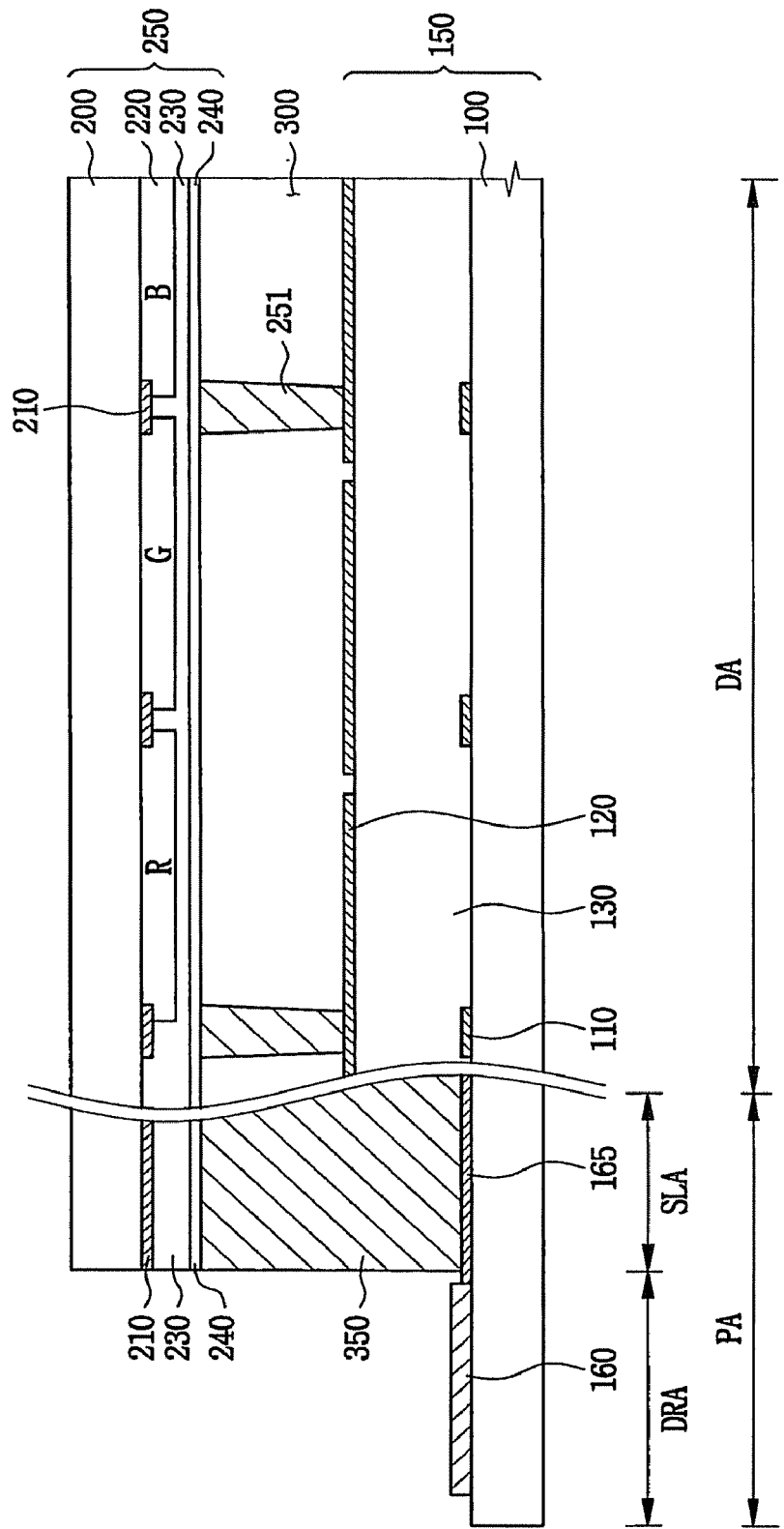
FIG. 15 is a cross-sectional view showing a transmissive type liquid crystal display apparatus according to a sixth exemplary embodiment of the present invention.

FIG. 15 is a cross-sectional view showing a transmissive type liquid crystal display apparatus according to a sixth exemplary embodiment of the present invention. The liquid crystal display apparatus of the present embodiment is same as in Embodiment 5 except for a color filter substrate. Thus, the same reference numerals will be used to refer to the same or like parts as those described in Embodiment 5 and any further explanation will be omitted.

Referring to FIG. 15, a liquid crystal display apparatus 700 according to a seventh exemplary embodiment of the present invention includes an array substrate 150 and a color filter substrate 250. The array substrate 150 includes a display region DA and a peripheral region PA. A plurality of pixels is formed in the display region, such that the pixels are arranged in a matrix shape. The peripheral region PA is disposed adjacent to the display region DA. The peripheral region PA includes a driving region DRA and a seal line region SLA. The seal line region SLA is interposed between the display region DA and the driving region DRA. A gate driving circuit 160 is formed in the driving region DRA, and a sealant 350 is formed in the seal line region SLA.

The color filter substrate 250 faces the display region DA and the seal line region SLA, and the color filter substrate 250 does not face the driving region DRA. Thus, a common electrode 240 of the color filter substrate 250 does not face the gate driving circuit 160.

Thus, when the array substrate 150 and the color filter substrate 250 are assembled together, the gate driving circuit 160 of the array substrate 150 does not face the common electrode 240 of the color filter substrate 250, so that a parasitic capacitance between the gate driving circuit 160 and the common electrode 240 is removed.

Embodiment 7

Figure 16:
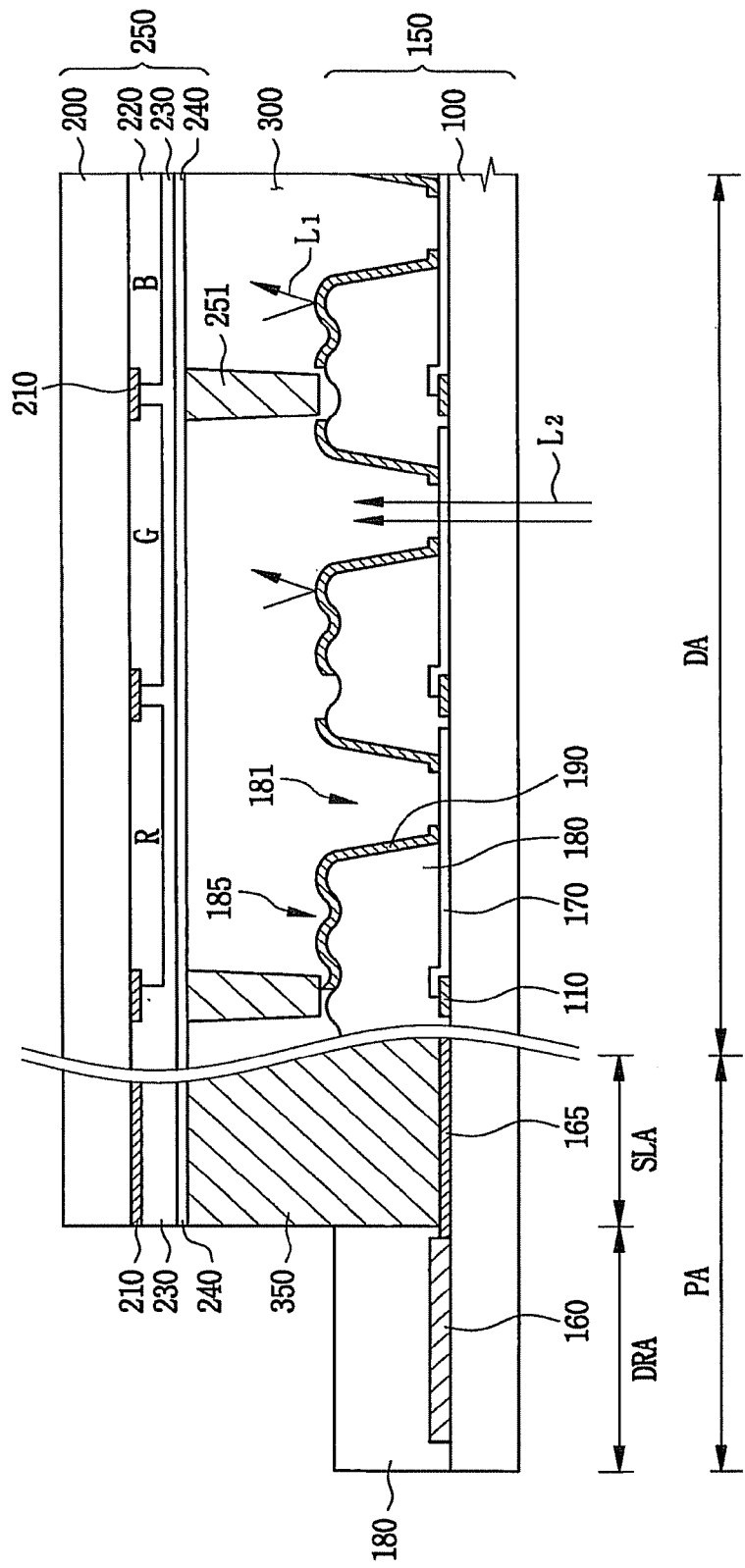
FIG. 16 is a cross-sectional view showing a reflective and transmissive type liquid crystal display apparatus according to a seventh exemplary embodiment of the present invention.

FIG. 16 is a cross-sectional view showing a reflective and transmissive type liquid crystal display apparatus according to a seventh exemplary embodiment of the present invention.

Referring to FIG. 16, a reflective and transmissive type liquid crystal display apparatus according to a seventh exemplary embodiment of the present invention includes an array substrate 150 and a color filter substrate 250.

The array substrate 150 includes a display region DA for displaying an image, a driving region DRA and a seal line region SLA interposed between the display region DA and the driving region DRA.

A thin film transistor 110, an organic insulation layer 180, a transparent electrode 170 and a reflective electrode 190 are formed in the display region DA. The transparent electrode 170 and the reflective electrode 190 are electrically connected to the thin film transistor 110. When the thin film transistor 110 is formed on a first substrate 100, the organic insulation layer 180 is formed on the first substrate 100, such that the organic insulation layer 180 covers the thin film transistor 110.

The organic insulation layer 180 covers a connecting portion between the transparent electrode 170 and drain electrode 113 of the thin film transistor 110, and the organic insulation layer 180 includes an opening window 181 for exposing a portion of the transparent electrode 170. The opening window 181 is not formed at the connecting portion between the transparent electrode 170 and drain electrode 113 of the thin film transistor 110. The organic insulation layer 180 includes a prominence and depression 185 so as to enhance reflectivity of the reflective electrode 190 that is to be formed on the organic insulation layer 180.

Then, the reflective electrode 190 is formed on the organic insulation layer 180 having a prominence and depression 185, such that the reflective electrode 190 is electrically connected to the transparent electrode 170.

The gate driving circuit 160 is formed in the driving region DRA of the array substrate 150 via a same process as the thin film transistor 110. The gate driving circuit 160 is electrically connected to gate lines of the display region DA via a connection wiring 165 of the seal line region SLA. The organic insulation layer 180 covers the gate driving circuit 160, so as to protect the gate driving circuit 160.

The organic insulation layer 180 of the seal line region SLA is removed so as to enhance a coherence of the sealant 350 and the array substrate 150 (or combination force between the sealant 350 and the array substrate 150). Removing the organic insulation layer 180 of the seal line region SLA and forming the opening window 181 are performed simultaneously. That is, no additional process for removing the organic insulation layer 180 is required.

The color filter substrate 250 is arranged, such that the color filter substrate 250 face the display region DA and the seal line region SLA. When the color filter substrate 250 and the array substrate 150 are assembled together, the gate driving circuit 160 does not face a common electrode 240 of the color filter substrate 250. Thus a parasitic capacitance between the gate driving circuit 160 and the common electrode 240 is not generated.

Embodiment 8

Figure 17:
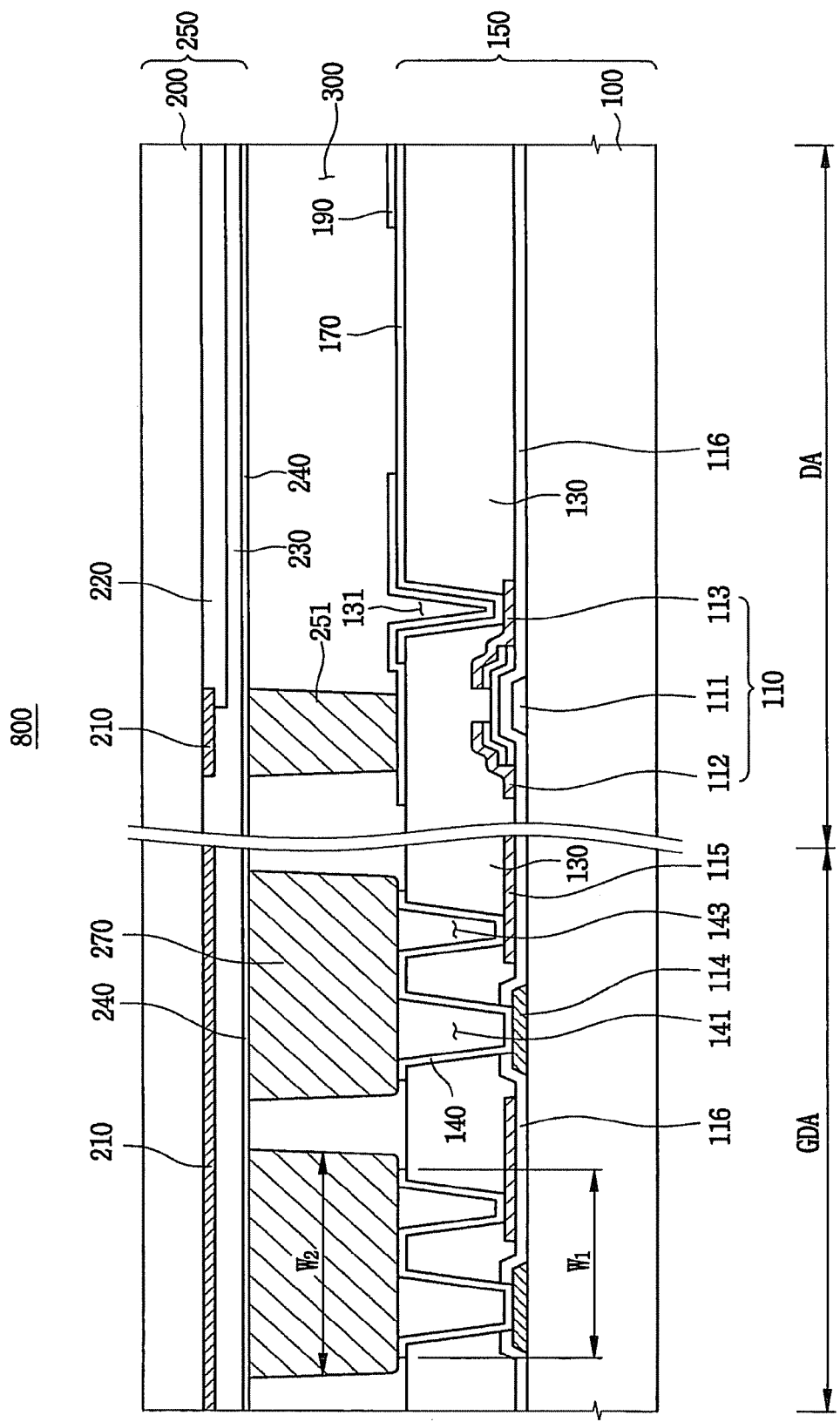
FIG. 17 is a cross-sectional view showing a reflective and transmissive type liquid crystal display apparatus according to an eighth exemplary embodiment of the present invention.

FIG. 17 is a cross-sectional view showing a reflective and transmissive type liquid crystal display apparatus according to an eighth exemplary embodiment of the present invention.

Referring to FIG. 17, a reflective and transmissive type liquid crystal display apparatus 800 according to an eighth exemplary embodiment of the present invention includes an array substrate 150 and a color filter substrate 250.

The array substrate 150 includes a display region DA for displaying an image, a gate driving region GDA and a data driving region (not shown).

The display region DA includes a plurality of pixels arranged in a matrix shape. Each of the pixels includes a thin film transistor 110, transparent electrode 170 and a reflective electrode 190. The thin film transistor 110 is electrically connected to a data line extending in a first direction, and a gate line extending in a second direction that is substantially perpendicular to the first direction. The reflective electrode 190 comprises a material that is electrically conductive and optically transparent, for example, such as indium tin oxide (ITO) and indium zinc oxide (IZO).

The thin film transistor 110 is electrically connected to the transparent electrode 170 and the reflective electrode 190 that is disposed over the transparent electrode 170.

An organic insulation layer 130 is interposed between the thin film transistor 110 and the transparent electrode 170. The organic insulation layer 130 includes a contact hole 131 for exposing a drain electrode of the thin film transistor 110. Thus, the transparent electrode 170 is electrically connected to the drain electrode via the contact hole 131.

A gate driving circuit is formed in the gate driving region GDA. The gate driving circuit and the thin film transistor 110 are formed via a same process. The gate driving circuit is electrically connected to the gate line so as to apply a gate driving signal to the gate line. The data driving circuit is formed in a chip, and the chip is mounted on the data driving region via a bonding process. When the gate driving signal is applied to the gate line, the data driving circuit applies an image signal to the data line.

As shown in FIG. 17, a first conductive pattern 114 is formed on the gate driving region GDA. The first conductive pattern 114 and a gate electrode 111 of the thin film transistor 110 are simultaneously patterned.

A second conductive pattern 115 is formed in the gate driving region GDA. The second conductive pattern 115 and source and drain electrodes 112 and 113 are simultaneously patterned.

The first and second conductive patterns 114 and 115 are electrically insulated from each other via a gate insulation layer 116.

The organic insulation layer 130 is formed on the second conductive pattern 115 and the gate insulation layer 116. The organic insulation layer 130 covers the display region DA and the gate driving region GDA. The organic insulation layer 130 includes first and second contact holes 141 and 143 at the gate driving region GDA.

The first contact hole 141 exposes the first conductive pattern 114, and the second contact hole 143 exposes the second conductive pattern 115.

The gate insulation layer 116 also includes a third contact hole corresponding to the first contact hole. The third contact hole exposes the first conductive pattern 114.

A conductive layer 140 is formed on the first conductive pattern 114 exposed via the first contact hole 141 and the third contact hole, the second conductive pattern 143 exposed via the second contact hole 143, and the organic insulation layer 130. The conductive layer 140 is electrically connected to both of the first and second conductive patterns 114 and 115, so that the first and second conductive patterns 114 and 115 are electrically connected with each other via the conductive layer 140.

The conductive layer 140 may comprise a material that is electrically conductive and optically transparent likewise the transparent electrode 170. Thus, the conductive layer 140 and the transparent electrode 170 may be formed simultaneously.

The conductive layer 140 may comprise a metal such as aluminum and aluminum alloy likewise the reflective electrode 190. Thus the conductive layer 140 and the reflective electrode 190 may be formed simultaneously.

Figure 18:
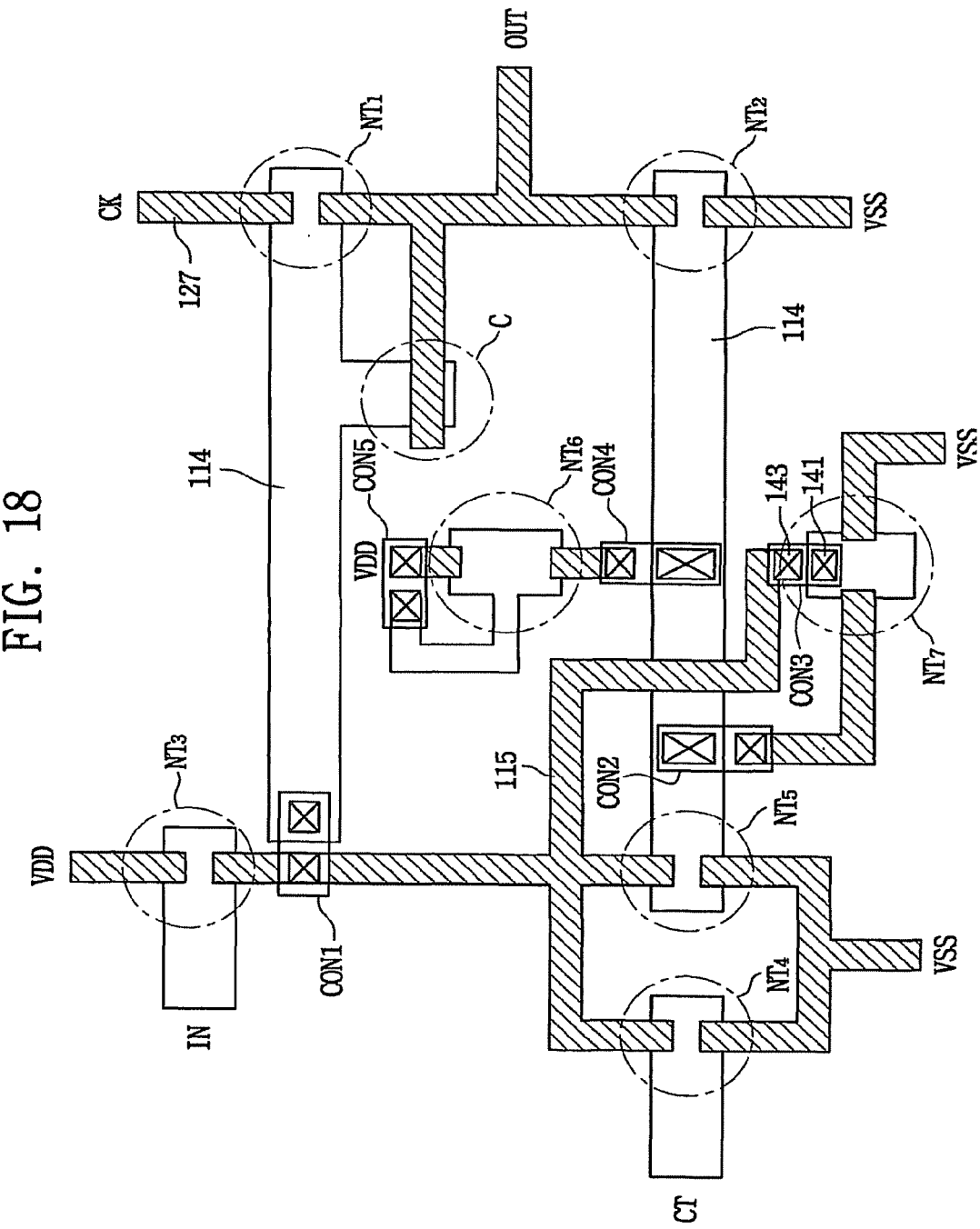
FIG. 18 is a layout showing a stage structure of a gate driving circuit of FIG. 17.

FIG. 18 is a layout showing a stage structure of a gate driving circuit of FIG. 17.

Referring to FIGS. 17 and 18, the gate driving circuit includes a shift register having a plurality of stages electrically connected to each other. Output terminals of the stages are electrically connected to the gate lines of the display region DA.

Each of the stages includes first to seventh NMOS transistors NT1, NT2, NT3, NT4, NT5, NT6 and NT7, and a capacitor C. The first to seventh NMOS transistors NT1 to NT7 are electrically connected to the capacitor C. In detail, each of the stages includes gate electrodes of the first to seventh NMOS transistors NT1 to NT7, and first conductive patterns 114 protruding from the gate electrode.

Further, each of the stages includes source and drain electrodes 115a and 115b of the first to seventh NMOS transistors NT1 to NT7, and second conductive pattern 115 protruding from the source and drain electrodes 115a and 115b.

A gate insulation layer 116 electrically insulates the first conductive pattern 114 from the second conductive pattern 115. However, a conductive layer 140 electrically connects the first conductive pattern 114 to the second conductive pattern 115.

Each of the stages includes first, second, third, fourth and fifth contact regions CON1, CON2, CON3, CON4 and CON5. The first contact region CON1 electrically connects a gate electrode of the first NMOS transistor NT1 to a source electrode of the third NMOS transistor NT3. The second contact region CON2 electrically connects a gate electrode of the second NMOS transistor NT2 to a drain electrode of the seventh NMOS transistor NT7. The third contact region CON3 electrically connects a gate electrode of the seventh NMOS transistor NT7 to a source electrode of the third NMOS transistor NT3. The fourth contact region CON4 electrically connects a gate electrode of the second NMOS transistor NT2 to a source electrode of the sixth NMOS transistor NT6. The fifth contact region CON5 electrically connects a gate electrode of the sixth NMOS transistor NT6 to a drain electrode of the sixth NMOS transistor NT6.

As described above, the gate electrode of the seventh NMOS transistor NT7 is electrically connected to the source electrode of the third NMOS transistor NT3 at the third contact region CON3. The organic insulation layer 130 disposed on the gate electrode of the seventh NMOS transistor NT7 and the source electrode of the third NMOS transistor NT3 includes a first contact hole 141 for exposing the gate electrode of the seventh NMOS transistor NT7, and a second contact hole 143 for exposing the source electrode of the third NMOS transistor NT3. The conducting layer 140 is electrically connected to the gate electrode of the seventh NMOS transistor NT7, and the source electrode of the third NMOS transistor NT3 via the first and second contact holes 141 and 143, respectively. Thus, the gate electrode of the seventh NMOS transistor NT7 and the source electrode of the third NMOS transistor NT3 are electrically connected to each other.

Figure 19:
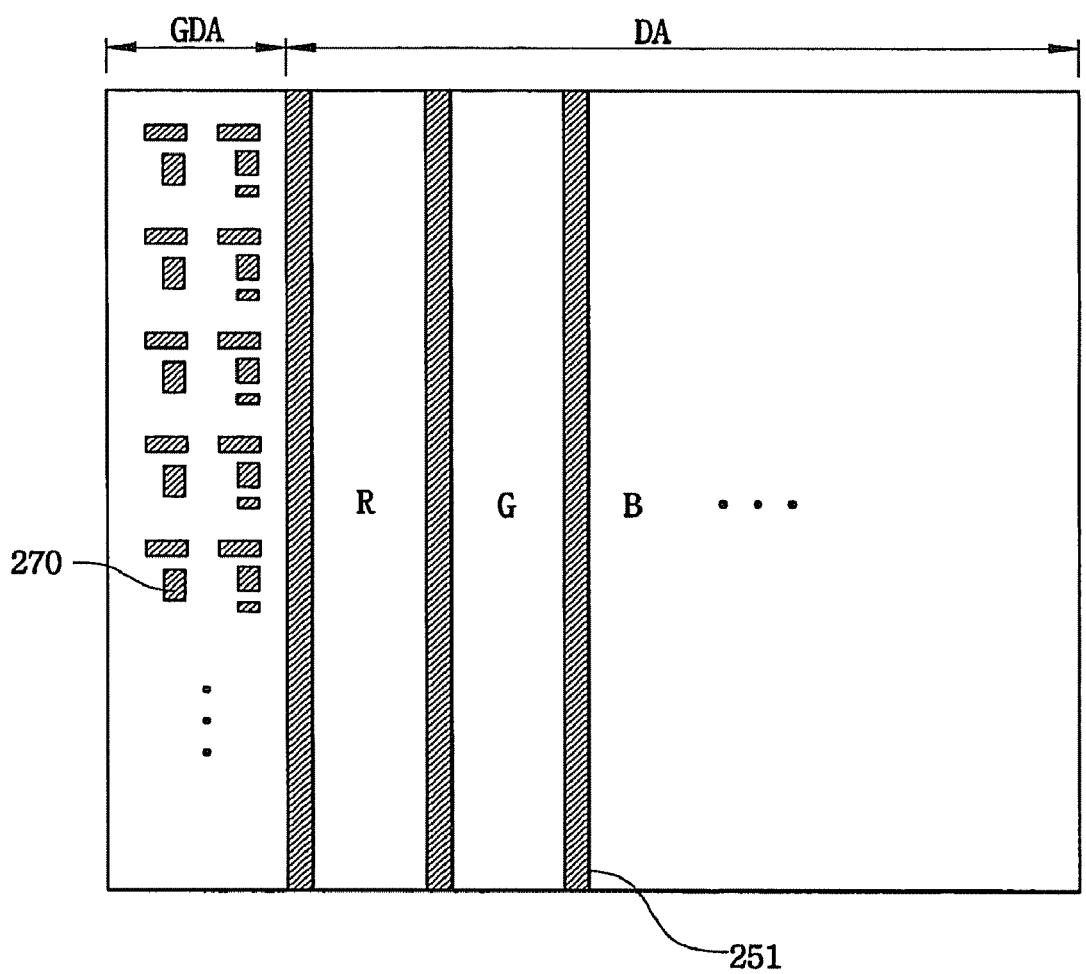
FIG. 19 is a plan view showing a color filter substrate of FIG. 17.

FIG. 19 is a plan view showing a color filter substrate of FIG. 17.

Referring to FIGS. 17 and 19, the color filter substrate 250 includes a black matrix 210, a color filter 220, a leveling layer 230, a common electrode 240, a cell gap retaining member 251 and an insulating member 270.

When the black matrix 210 and the color filter 220 are formed, the leveling layer is formed on the black matrix 210 and the color filter 220 so as to reduce a thickness difference between the black matrix 210 and the color filter 220.

Then, the common electrode 240 comprising a material that is electrically conductive and optically transparent, such as indium tin oxide (ITO) and indium zinc oxide (IZO), etc. is formed on the leveling layer 230.

The cell gap retaining member 251 and the insulating member 270 are formed on the common electrode 240. The cell gap retaining member 251 is formed in the display region DA so as to keep the color filter substrate 250 away from the array substrate 150.

The insulating member 270 is formed, such that the insulating member 270 corresponds to the first to fifth contact region CON1 to CON5 having the conducting layer 140. That is, the insulating member 270 is interposed between the common electrode 240 of the color filter substrate 250 and the conducting layer 140 formed on the first to fifth contact region CON1 to CON5, so that the insulating member 270 electrically insulates the common electrode 240 from the conducting layer 140.

Thus, the insulating member 270 prevents the conducting layer 140 and the common electrode 240 from being electrically shorted.

Further, the insulating member 270 has a lower dielectric constant than the liquid crystal layer 300, so that a parasitic capacitance between the conducting layer 140 and the common electrode 240 are reduced.

The insulating member 270 and the cell gap retaining member 251 comprise same material as each other. That is, the insulating member 270 and the cell gap retaining member 251 are formed via a same procedure.

As shown in FIG. 17, a first width W1 of the second contact region CON2 is narrower than a second width W2 of the insulating member 270. In detail, the first width W1 is smaller than the second width W2 by about 0.1 μm.

An area of the insulating member 270 is smaller than an area of the second contact region CON2, so that the first width W1 is smaller than the second width W2.

Thus, the conducting layer 140 may not face the common electrode 240 to reduce the parasitic capacitance between the conducting layer 140 and the common electrode 240.

As described above, according to a upper substrate and a liquid crystal display apparatus having the upper substrate, an insulating layer or air having a lower dielectric constant than a liquid crystal layer is interposed between a driving section of a lower substrate and a common electrode of the upper substrate.

Thus, a parasitic capacitance between the driving section and the common electrode is reduced to prevent malfunction of the driving section, and a display quality is enhanced.

Further, an electrical short between the driving section and the common electrode is prevented, so that display quality of the liquid crystal display apparatus is enhanced.

Although the preferred embodiments of the present invention have been described, it is understood that the present invention should not be limited to these preferred embodiments but various changes and modification can be made by one skilled in the art within the spirit and scope of the present invention as hereinafter claimed.

What is claimed is:

1. A liquid crystal display apparatus comprising:
  a lower substrate including:
    a display part which displays an image; and
    a driving part which drives the display part, the driving part including a conducting layer which electrically connects a first conductive pattern to a second conductive pattern disposed at a different layer than the first conductive pattern;
an upper substrate including:
a common electrode; and
an insulating member which protrudes toward the lower substrate and contacts the conducting layer; and
a liquid crystal layer that is interposed between the lower substrate and the upper substrate.

2. The liquid crystal display apparatus of claim 1, wherein the insulating member has a lower dielectric constant than the liquid crystal layer.

3. The liquid crystal display apparatus of claim 1, further comprising a cell gap retaining member disposed between the lower substrate and the upper substrate so as to maintain the cell gap between the lower substrate and the upper substrate.

4. The liquid crystal display apparatus of claim 3, wherein the insulating member and the cell gap retaining member comprise a photosensitive acryl resin.

5. The liquid crystal display apparatus of claim 1, wherein the lower substrate further comprises a photosensitive organic insulating layer disposed between the second conductive pattern and the conducting layer, and the photosensitive organic insulating layer includes a first contact hole for exposing the first conductive pattern and a second contact hole for exposing the second conductive pattern.

6. The liquid crystal display apparatus of claim 5, wherein the conducting layer is electrically connected to the first and second conductive patterns via the first and second contact holes, respectively, so as to electrically connect the first conductive pattern to the second conductive pattern.

7. The liquid crystal display apparatus of claim 6, wherein the conducting layer is optically transparent.

8. The liquid crystal display apparatus of claim 7, wherein the conducting layer is formed of the same material as a transparent electrode of the display part.

9. The liquid crystal display apparatus of claim 1, wherein the insulating member has a width no less than the conductive layer, and entirely covers the conductive layer.

* * * * *